United States Patent
Cho et al.

(10) Patent No.: US 11,899,980 B2
(45) Date of Patent: *Feb. 13, 2024

(54) STORAGE DEVICE INCLUDING A TURBO WRITE BUFFER DIVIDED INTO A NON-PINNED BUFFER AREA AND A PINNED BUFFER AREA, AN OPERATION METHOD OF A STORAGE SYSTEM INCLUDING THE STORAGE DEVICE IN WHICH DATA OF THE NON-PINNED AND PINNED BUFFER AREAS ARE FLUSHED DIFFERENTLY, AND A HOST DEVICE CONTROLLING THE STORAGE DEVICE

(71) Applicant: SAMSUNG ELECTRONICS CO., LTD., Suwon-si (KR)

(72) Inventors: Hyunsoo Cho, Bucheon-si (KR); Dong-Min Kim, Hwaseong-si (KR); Kyoung Back Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,959

(22) Filed: Oct. 20, 2022

(65) Prior Publication Data
US 2023/0045892 A1  Feb. 16, 2023

Related U.S. Application Data

(63) Continuation of application No. 16/943,268, filed on Jul. 30, 2020, now Pat. No. 11,500,583.

(30) Foreign Application Priority Data

Aug. 2, 2019 (KR) .................. 10-2019-0094253

(51) Int. Cl.
G06F 3/06 (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC .... G06F 3/0659; G06F 3/0604; G06F 3/0644; G06F 3/0679; G06F 3/061
See application file for complete search history.

(56) References Cited

U.S. PATENT DOCUMENTS 7,350,044 B2   3/2008  Keays
7,620,773 B2   11/2009 Nicholson et al.
(Continued)

OTHER PUBLICATIONS

JEDEC Standard, "Unviersal Flash Storage", JESD220A, JEDEC Solid State Technology Association, Jun. 2012, 408 Pages.

*Primary Examiner* — David Yi
*Assistant Examiner* — Nicholas A. Paperno
(74) *Attorney, Agent, or Firm* — F. Chau & Associates, LLC

(57) ABSTRACT

An operation method of a UFS device including: determining, by a host, area information for write data, wherein in a turbo read the write data is stored in a non-pinned or pinned buffer area and in a normal read the write data is stored in a user storage; transferring, by the host, a first command UFS protocol information unit (UPIU); transferring, by the UFS device, an RTT UPIU to the host, transferring, by the host, a DATA OUT UPIU to the UFS device; mapping, by UFS device, a first logical block address with a physical address of an area corresponding to the area information; transferring, by the host, a second command UPIU; and performing the turbo read on the area to read data corresponding to the first logical block address when the area corresponding to the area information is the pinned or non-pinned turbo write buffer.

16 Claims, 29 Drawing Sheets

(56) References Cited

U.S. PATENT DOCUMENTS

| | | |
|---|---|---|
| 8,555,106 B2 | 10/2013 | Sakaguchi et al. |
| 8,838,927 B2 | 9/2014 | Chiu et al. |
| 8,972,694 B1 | 3/2015 | Dolan et al. |
| 9,519,577 B2 | 12/2016 | Kruger |
| 9,542,336 B2 | 1/2017 | Torrant et al. |
| 9,733,844 B2 | 8/2017 | Gong et al. |
| 2008/0025706 A1 | 1/2008 | Yoshida et al. |
| 2014/0244907 A1 | 8/2014 | Watanabe |
| 2014/0293712 A1 | 10/2014 | Kim et al. |
| 2015/0268860 A1 | 9/2015 | Yum et al. |
| 2016/0231950 A1* | 8/2016 | Kim ............... G06F 3/0659 |
| 2019/0056886 A1 | 2/2019 | Nagarajan et al. |
| 2019/0220218 A1 | 7/2019 | Deshe et al. |
| 2019/0332298 A1 | 10/2019 | Madabhushi |
| 2021/0011842 A1 | 1/2021 | Lee |
| 2021/0034300 A1 | 2/2021 | Cho |

* cited by examiner

[LU dedicated buffer type]

[Shared buffer type]

FIG. 4B
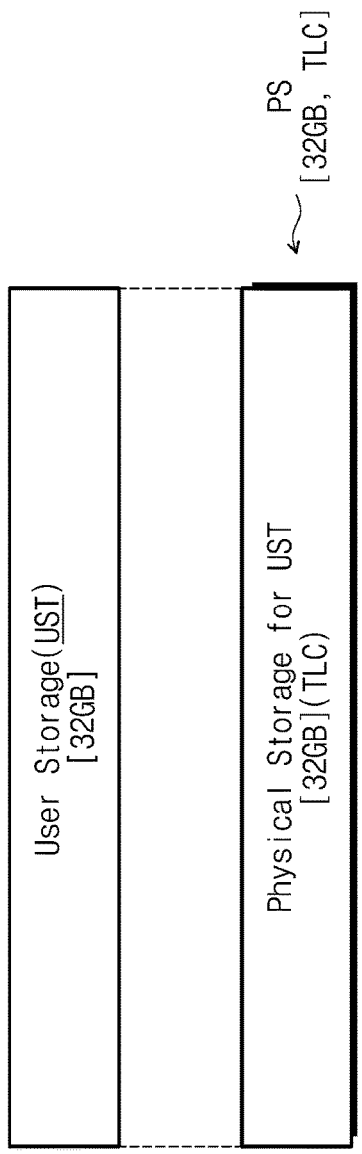
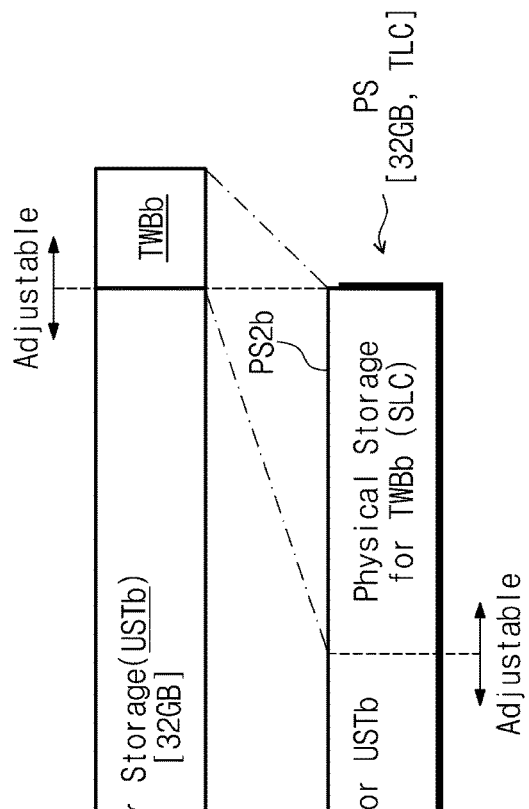

FIG. 12C
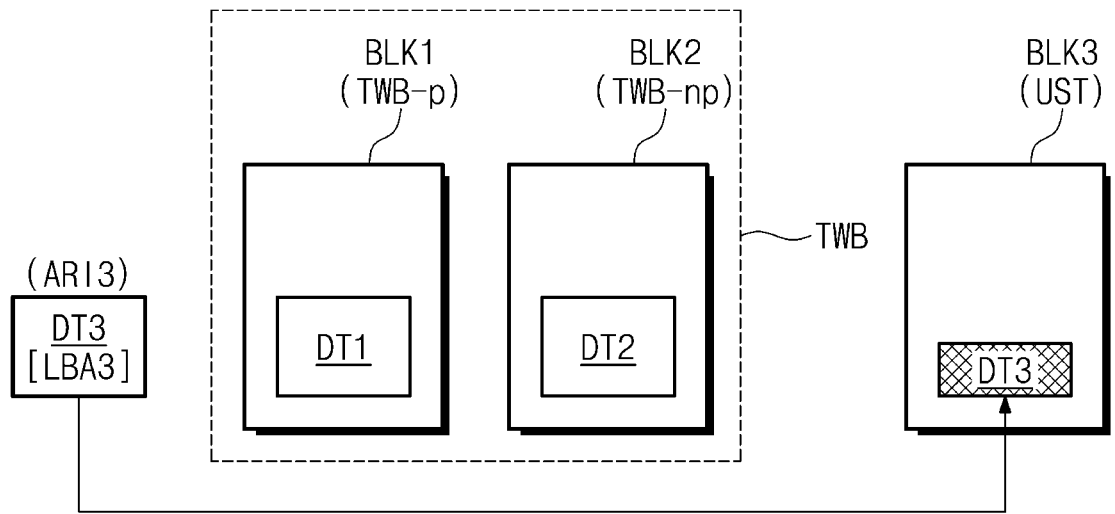
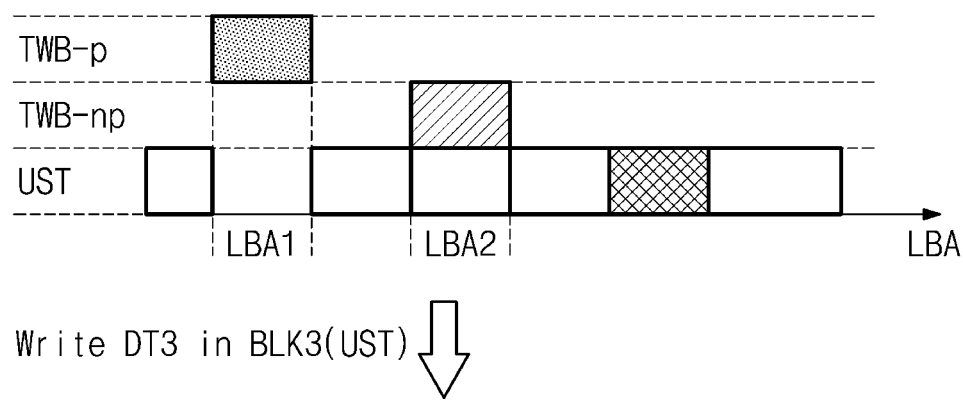
Write DT3 in BLK3(UST) ⇩
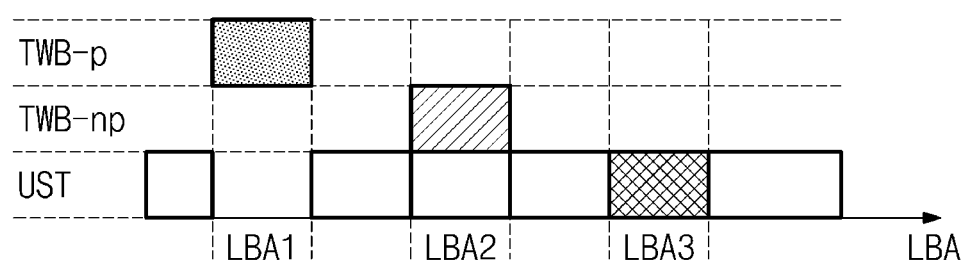

FIG. 13A

CMD UPIU

| Trans Type | Flags(ARI) | LUN | Task Tag |
|---|---|---|---|
| IID / CST | Reserved | Reserved | Reserved |
| EHS Length | Reserved | Data Segment Length ||

Expected Data Transfer Length

Command Descriptor Block
(CDB)

Header

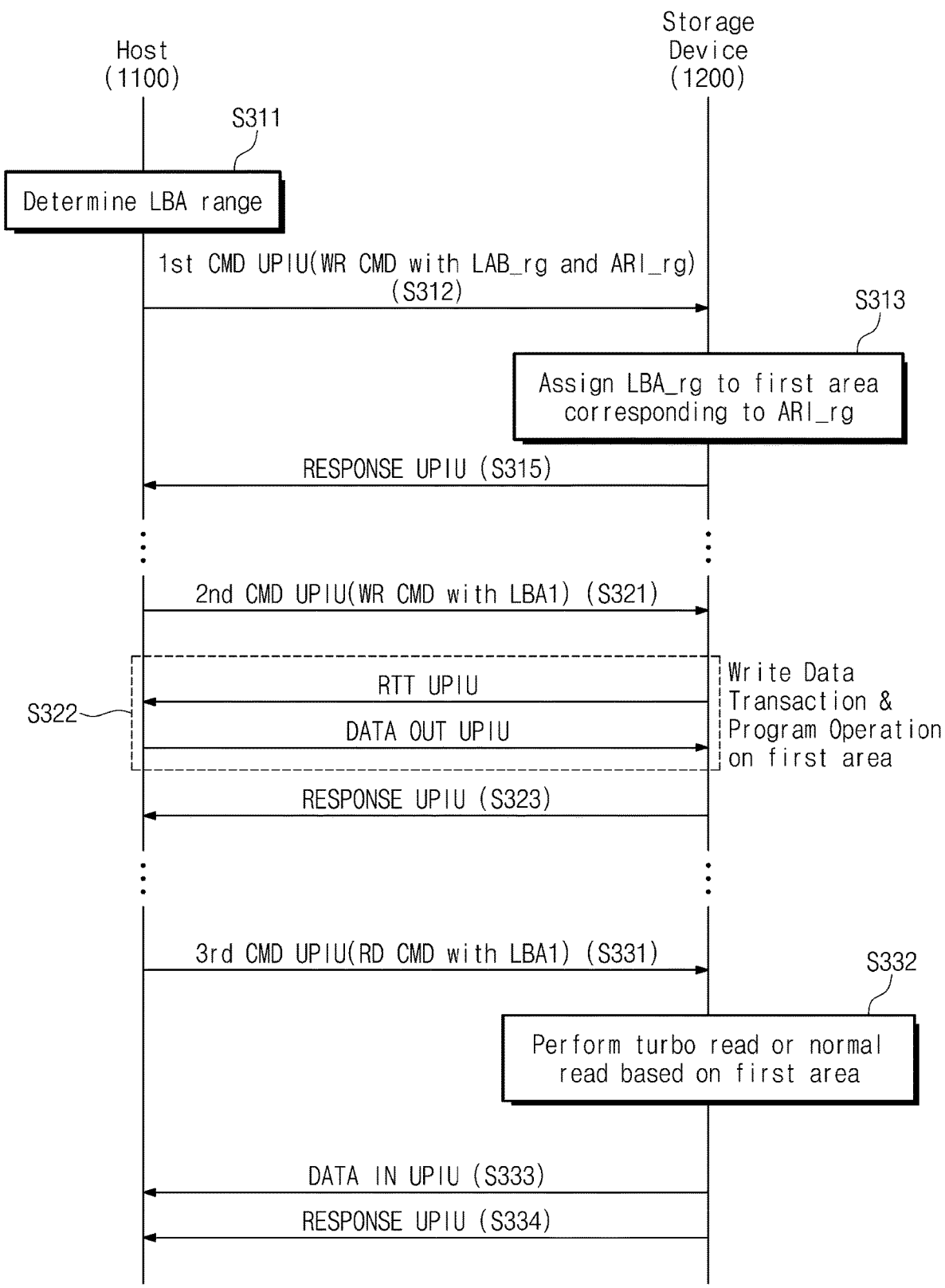

FIG. 16A
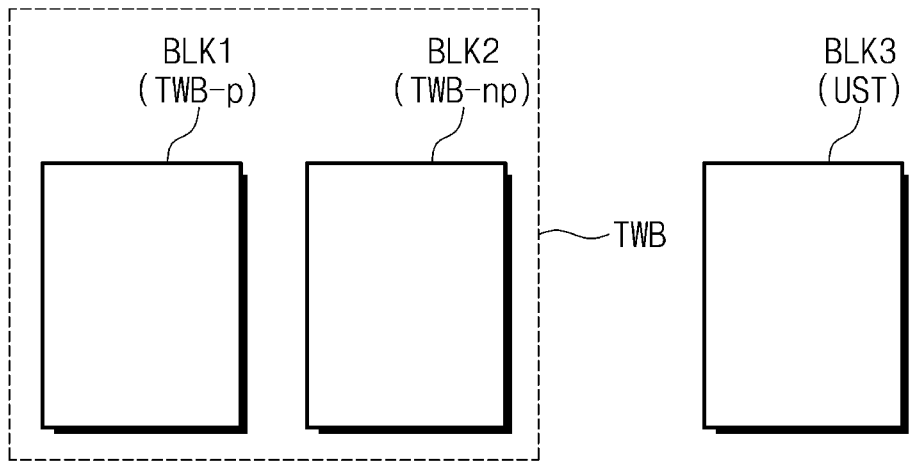
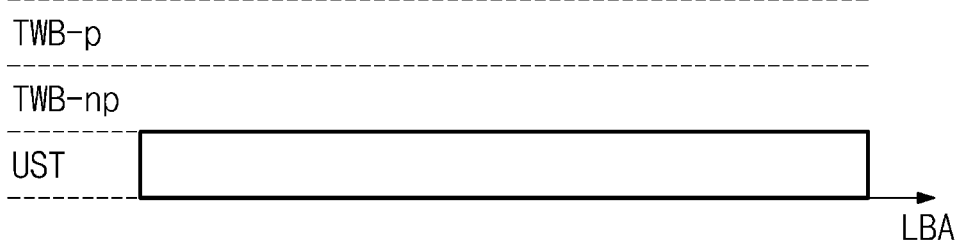
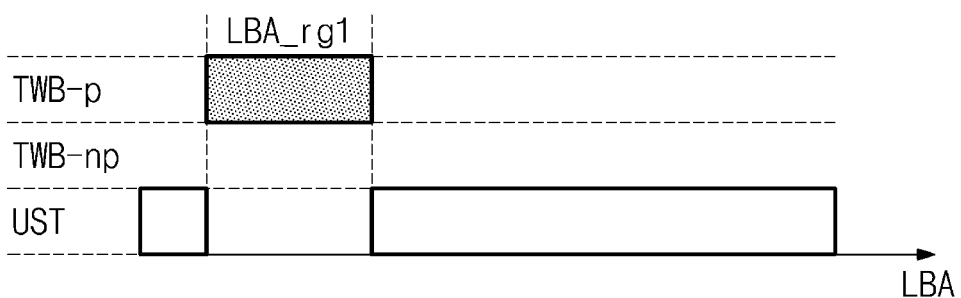

FIG. 16B
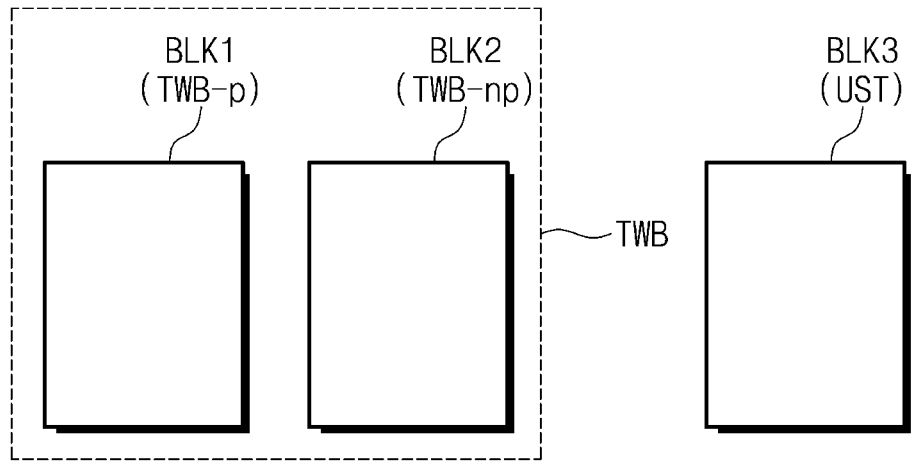
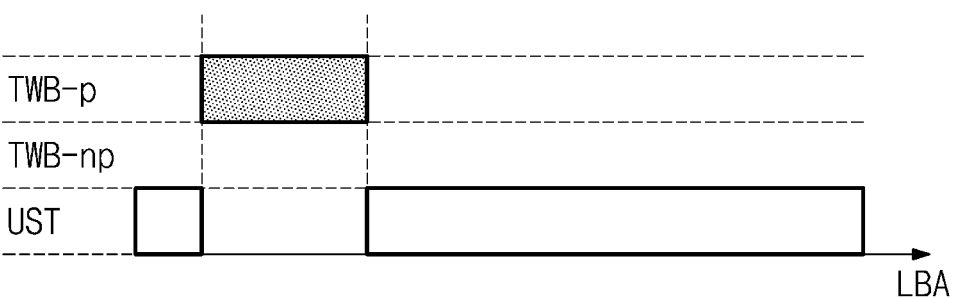
Assign LBA_rg2 to TWB-np
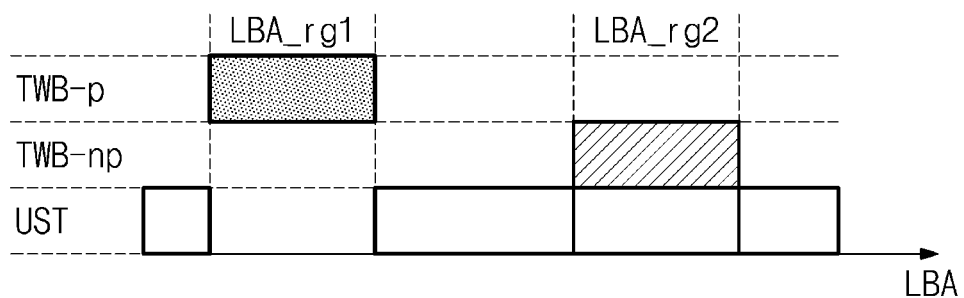

FIG. 17C
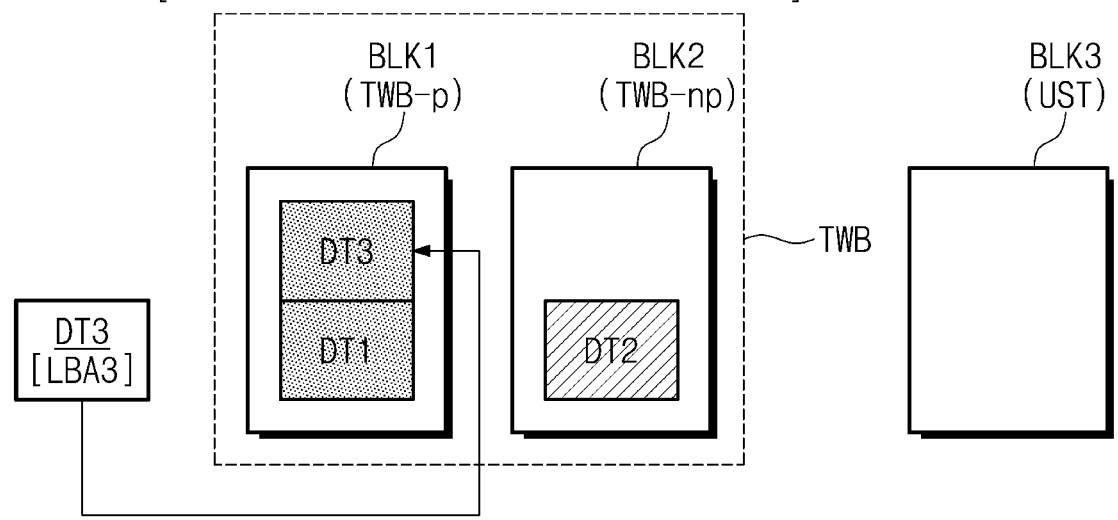
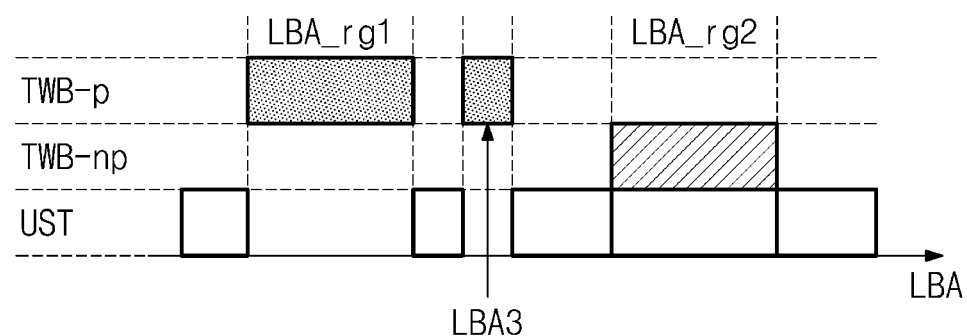

FIG. 19

QUERY REQUEST UPIU

| Trans Type | Flags | Reserved | Task Tag |
|---|---|---|---|
| Reserved | Query Function | Reserved | Reserved |
| Transaction Specific Fields ||||
| Reserved ||||
| Header E2ECRC ||||
| Data ||||
| Data E2ECRC ||||

STORAGE DEVICE INCLUDING A TURBO WRITE BUFFER DIVIDED INTO A NON-PINNED BUFFER AREA AND A PINNED BUFFER AREA, AN OPERATION METHOD OF A STORAGE SYSTEM INCLUDING THE STORAGE DEVICE IN WHICH DATA OF THE NON-PINNED AND PINNED BUFFER AREAS ARE FLUSHED DIFFERENTLY, AND A HOST DEVICE CONTROLLING THE STORAGE DEVICE

CROSS-REFERENCE TO RELATED APPLICATIONS

This application is a continuation of U.S. patent application Ser. No. 16/943,268 filed on Jul. 30, 2020, which claims priority under 35 U.S.C. § 119 to Korean Patent Application No. 10-2019-0094253 filed on Aug. 2, 2019, in the Korean Intellectual Property Office, the disclosures of which are incorporated by reference herein in their entireties.

TECHNICAL FIELD

Exemplary embodiments of the inventive concept relate to a semiconductor memory, and more particularly, to a storage device, and an operation method of a storage system including the storage device and a host device controlling the storage device.

DISCUSSION OF RELATED ART

A semiconductor memory device may be classified as a volatile memory device or a nonvolatile memory device. A voltage memory device only maintains its data while the device is powered. Examples of the volatile memory device include a static random access memory (SRAM) or a dynamic random access memory (DRAM). A nonvolatile memory device does not lose data when power is lost. Examples of the nonvolatile memory device include a flash memory device, a phase-change RAM (PRAM), a magnetic RAM (MRAM), a resistive RAM (RRAM), or a ferroelectric RAM (FRAM).

A flash memory device is increasingly being used as a high-capacity storage medium in a computing device. Various technologies for supporting a high-speed operation of the flash memory device are being developed. For example, a universal flash storage (UFS) interface defined by the JEDEC standard may support a higher operating speed than a conventional flash memory based storage device.

SUMMARY

According to an exemplary embodiment of the inventive concept, there is provided a storage device including: a nonvolatile memory device including a first area, a second area, and a third area; and a controller configured to receive a first write command including a first logical block address from a host device, to receive first data corresponding to the first logical block address in response to the first write command, and to store the first data in the nonvolatile memory device, wherein, when the first write command includes area information, the controller stores the first data in one of the first area and the second area based on the area information, wherein, when the first write command does not include the area information, the controller stores the first data in the third area, and wherein each of the first area and the second area includes memory cells each configured to store "n" bits (n being a positive integer), and the third area includes memory cells each configured to store "m" bits (m being a positive integer greater than n).

According to an exemplary embodiment of the inventive concept, there is provided a storage device including: a nonvolatile memory device including a first area, a second area, and a third area; and a controller configured to receive a first command including a first logical block address range and first range area information from a host device, and to assign an area corresponding to the first range area information from among the first area, the second area, and the third area to the first logical block address range in response to the first command, wherein the controller is further configured to receive a first write command including a first logical block address from the host device and to store first data corresponding to the first logical block address in the assigned area, and wherein the first logical block address is included in the first logical block address range.

According to an exemplary embodiment of the inventive concept, there is provided an operation method of a storage system which includes a storage device including a first area, a second area, and a third area, and a host device configured to communicate with the storage device, the method including: transferring, by the host device, a first write command including a first logical block address and first area information to the storage device; receiving, by the storage device, the first write command and selecting an area corresponding to the first area information from among the first area, the second area, and the third area; transferring, by the storage device, a ready to transfer universal flash storage protocol information unit (UPIU) to the host device; transferring, by the host device, a DATA OUT UPIU, in which first data corresponding to the first logical block address are included, to the storage device; receiving, by the storage device, the DATA OUT UPIU and storing the first data in the area corresponding to the first area information, in response to a ready to transfer UPIU; transferring, by the storage device, a first response UPIU to the host device; and managing, by the storage device, a mapping relationship between the first logical block address and a physical address of the area corresponding to the first area information.

According to an exemplary embodiment of the inventive concept, there is provided a storage device including: a nonvolatile memory device including a first block, a second block and a third block; and a memory controller configured to: receive a write command including a logical block address and block information from a host, select a block corresponding to the block information from among the first block, the second block, and the third block; transfer a ready to transfer universal flash storage protocol information unit WPM) to the host; receive a DATA OUT UPIU in which data corresponding to the logical block address are included from the host; store the data in the block corresponding to the block information; transfer a response UPIU to the host; and manage a mapping relationship between the logical block address and a physical address of the block corresponding to the block information.

BRIEF DESCRIPTION OF THE FIGURES

The above and other features of the inventive concept will become apparent by describing in detail exemplary embodiments thereof with reference to the accompanying drawings.

FIGS. 4A and 4B are diagrams for describing modes to configure a turbo write buffer of a storage device of FIG. 1.

FIGS. 12A, 12B and 12C are diagrams for describing a write operation according to the flowchart of FIG. 11 in detail.

FIGS. 13A and 13B are diagrams for describing a method of setting area information at a write command UPIU.

FIG. 15 is a flowchart illustrating an operation of a storage system of FIG. 1.

FIGS. 16A and 16B are diagrams for describing a logical block address range assigning operation according to the flowchart of FIG. 15.

FIGS. 17A, 17B and 17C are diagrams for describing a write operation according to the flowchart of FIG. 15.

FIG. 19 is a diagram for describing operation S412 of FIG. 18.

DETAILED DESCRIPTION OF THE EMBODIMENTS

Below, embodiments of the inventive concept are described in detail and clearly to such an extent that one of ordinary skill in the art can implement the inventive concept.

Components that are described in the detailed description with reference to the terms "unit", "module", or "block" and function blocks illustrated in drawings may be implemented with software, hardware, or a combination thereof. In an embodiment, the software may be a machine code, firmware, an embedded code, and application software. For example, the hardware may include an integrated circuit (IC), an application specific IC (ASIC), a field programmable gate array (FPGA), a complex programmable logic device (CPLD), a microelectromechanical system (MEMS), a processor, a passive element, or a combination thereof.

Figure 1:
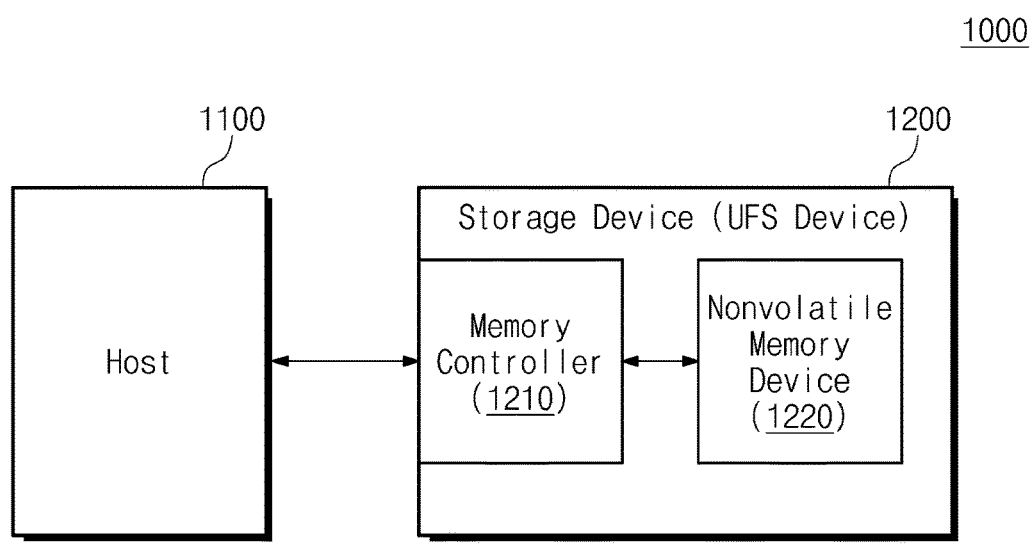
FIG. 1 is a block diagram illustrating a storage system according to an exemplary embodiment of the inventive concept.

FIG. 1 is a block diagram illustrating a storage system according to an exemplary embodiment of the inventive concept. Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function mays be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
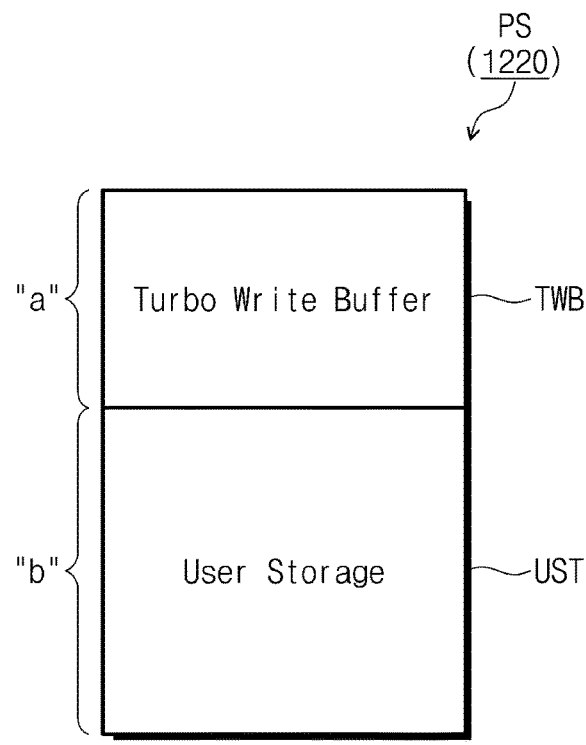
FIG. 2 is a diagram illustrating a physical storage space of a storage device of FIG. 1.

FIG. 2 is a diagram illustrating a physical storage space PS of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 3A:
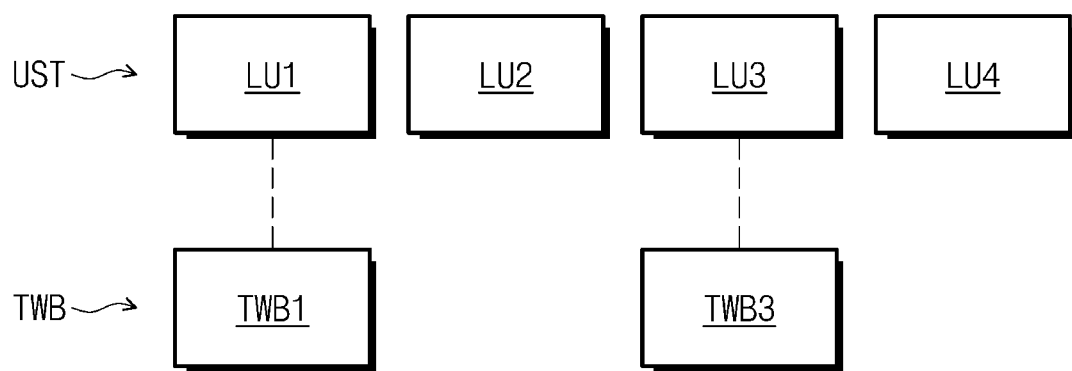
FIGS. 3A and 3B are diagrams for describing a turbo write buffer of FIG. 2.
Figure 3B:
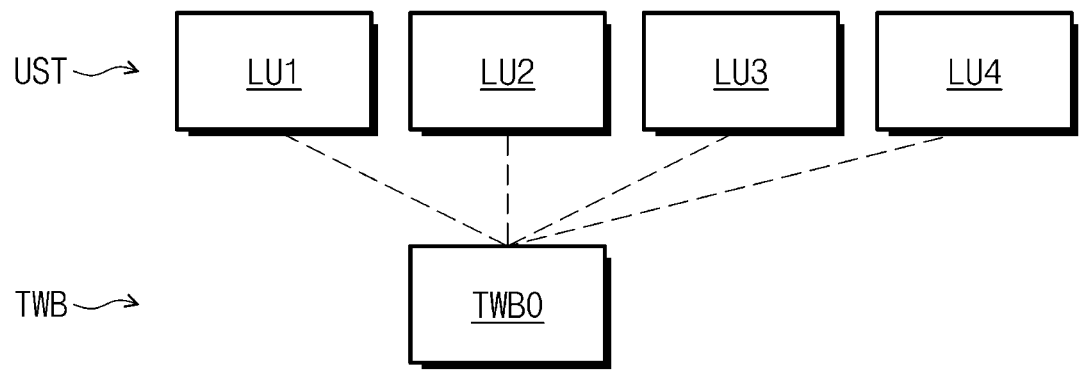

FIGS. 3A and 3B are diagrams for describing a turbo write buffer of FIG. 2. Referring to FIGS. 1, 2, 3A, and 3B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the nonvolatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 3A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 3B, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 4A:
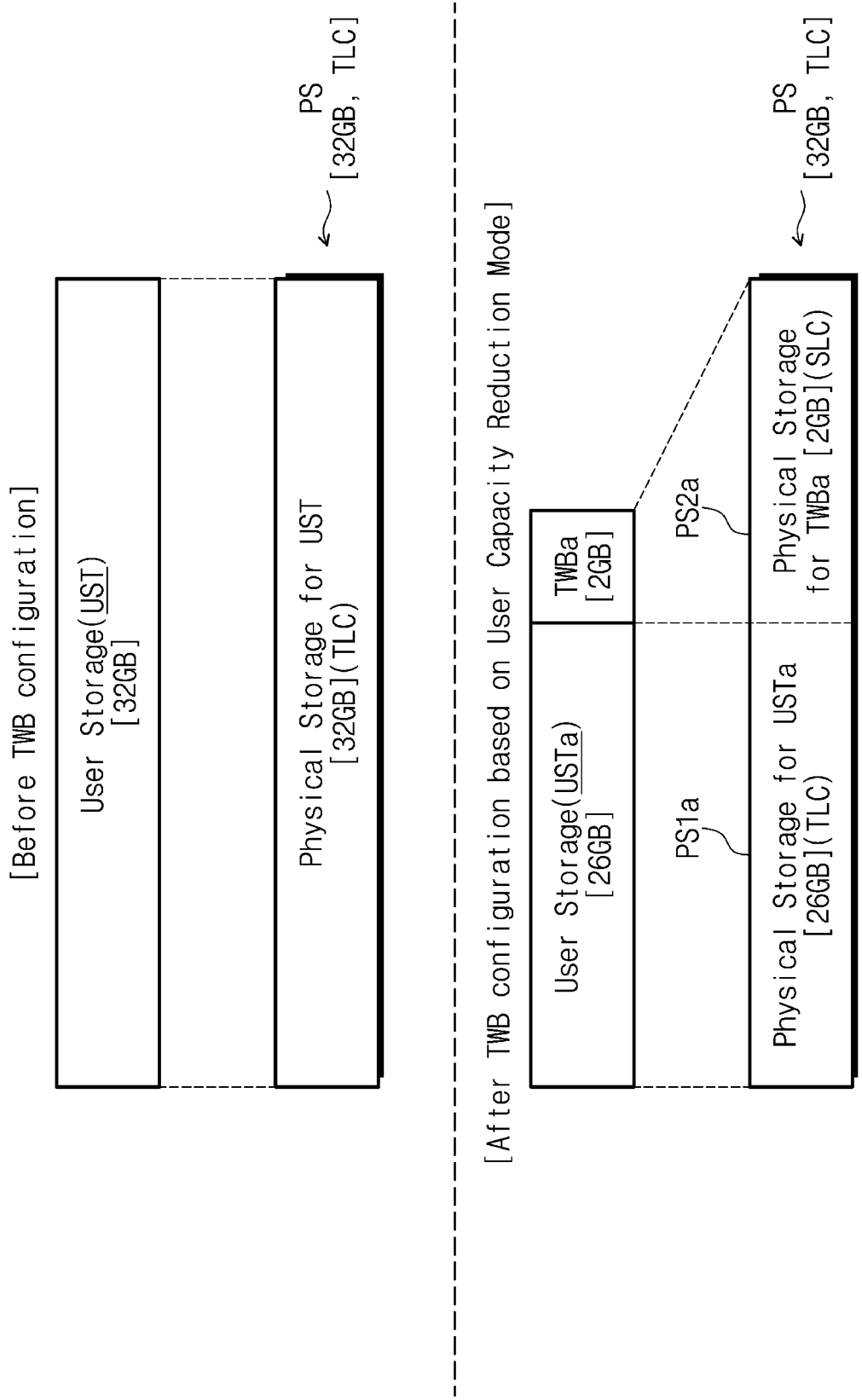

FIGS. 4A and 4B are diagrams for describing modes to configure a turbo write buffer of a storage device of FIG. 1. Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 4A, and 4B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 4A, the physical storage space PS of the storage device 1200 may be 32 GB on the basis of the TLC.

Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa, or may be used for the turbo write buffer TWBa.

In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1".

In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PS1a corresponding to the user storage USTa and the second physical storage space PS2a corresponding to the turbo write buffer TWBa may be physically adjacent to each other or may be physically spaced from each other.

The no user capacity reduction mode may be a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the no user capacity reduction mode, the turbo write buffer TWBb having a particular capacity (e.g., 2 GB) may be configured. A second physical storage space PS2b, which is a portion of the physical storage space may be assigned to the turbo write buffer TWBb or may be used for the turbo write buffer TWBb.

Unlike the user capacity reduction mode, the user storage USTb in the no user capacity reduction mode may maintain the capacity of 32 GB. In other words, in the no user capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the no user capacity reduction mode, a size or configuration of the turbo write buffer TWBb may be varied by an internal policy of the storage device 1200 or an explicit request from the host 1100. For example, because the second physical storage space PS2b, which is a portion of the physical storage space PS, is used to configure the turbo write buffer TWBb, the first physical storage space PS1b to be used for the user storage USTb may be smaller than a capacity of the user storage USTb.

In other words, in the case where the entire first physical storage space PS1b is used to store user data or an available free capacity of the first physical storage space PS1b is equal to or smaller than a reference value, all or a portion of the second physical storage space PS2b used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2b assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSize") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the no user capacity reduction mode, because the user storage UST and the turbo write buffer TWB share the physical storage space PS, in the case where a write operation is performed on the user storage UST, the lifetime of the turbo write buffer TWB may decrease.

Figure 5:
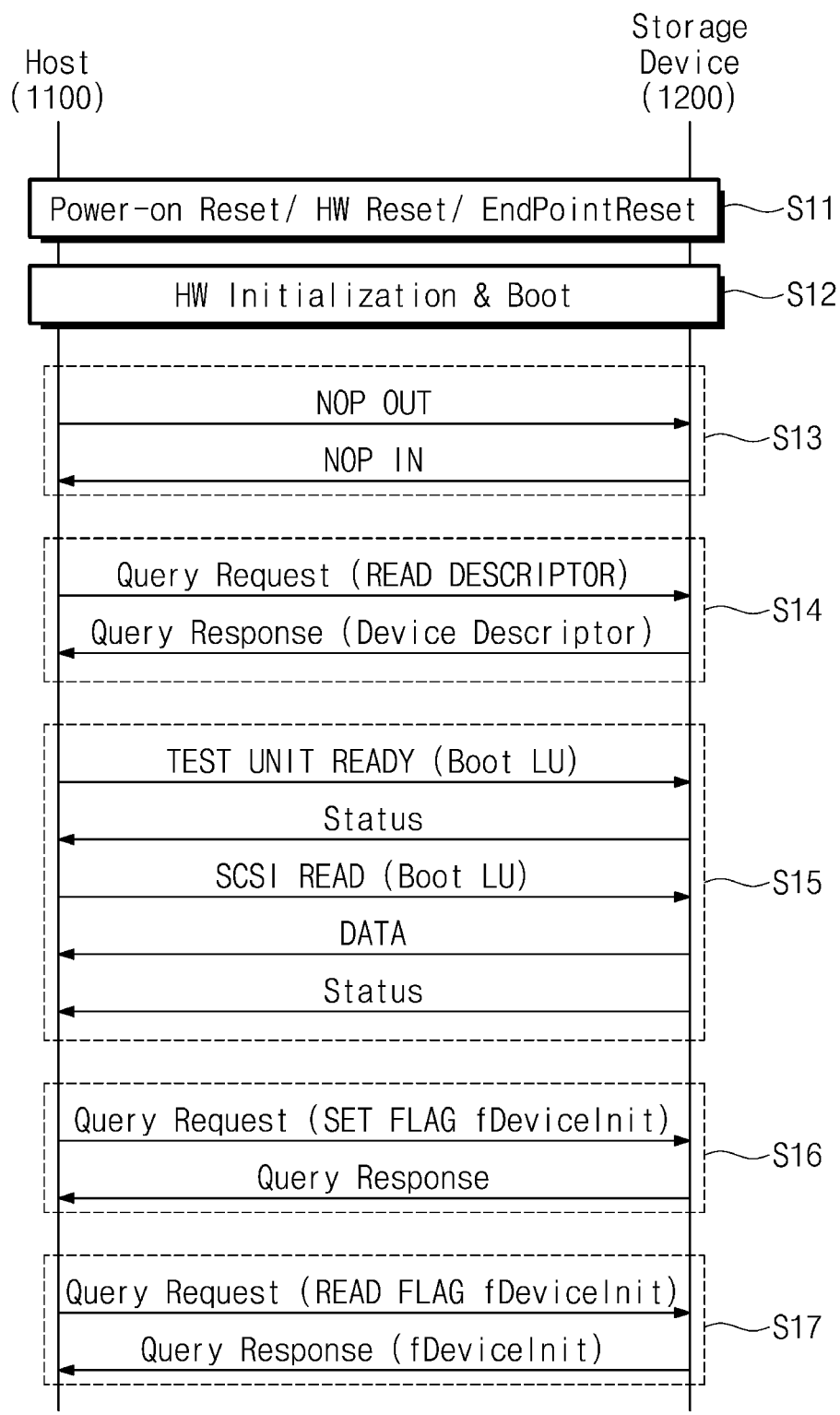
FIG. 5 is a flowchart illustrating an operation of a storage system of FIG. 1.

FIG. 5 is a flowchart illustrating an operation of a storage system of FIG. 1. An initialization operation of the storage system 1000 is described with reference to FIG. 5. Referring to FIGS. 1, 2, and 5, in operation S11, the host 1100 and the storage device 1200 may perform an operation such as a power-on reset operation, a hardware reset operation, or an endpoint reset operation.

In operation S12, the host 1100 and the storage device 1200 may perform hardware reset and booting. For example, hardware layers of each of the host 1100 and the storage device 1200 may be initialized and booted.

In operation SE, the host 1100 and the storage device 1200 may perform initialization on a particular layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeatures- Support") including information about whether to support the turbo write function. In an exemplary embodiment of the inventive concept, the information about whether to support the turbo write function may be set to a particular bit bit[8]) of the extended UFS function support field.

The device descriptor may further include a turbo write buffer no user space reduction enable field (e.g., "bTurboWriteBufferNoUserSpaceReductionEn") including information about a turbo write buffer mode. In the case where a value of the turbo write buffer no user space reduction enable field is "00h", the turbo write buffer TWB may be configured depending on the user capacity reduction mode described with reference to FIG. 4A. In the case where a value of the turbo write buffer no user space reduction enable field is "01h", the turbo write buffer TWB may be configured depending on the no user capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 3A. In the case where a value of the turbo write buffer type field is "01h", the turbo write buffer TWB may be configured depending on the shared buffer type described with reference to FIG. 3B.

The device descriptor may further include a shared turbo write buffer allocation number field (e.g., "dNumSharedTurboIWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer no user space reduction enable, and the number of units assigned to a turbo write buffer, by writing values of various fields of the configuration descriptor. In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no user capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "DeviceInit") of the flag of the storage device 1200. For example, the host 1100 may transfer a query request for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 6:
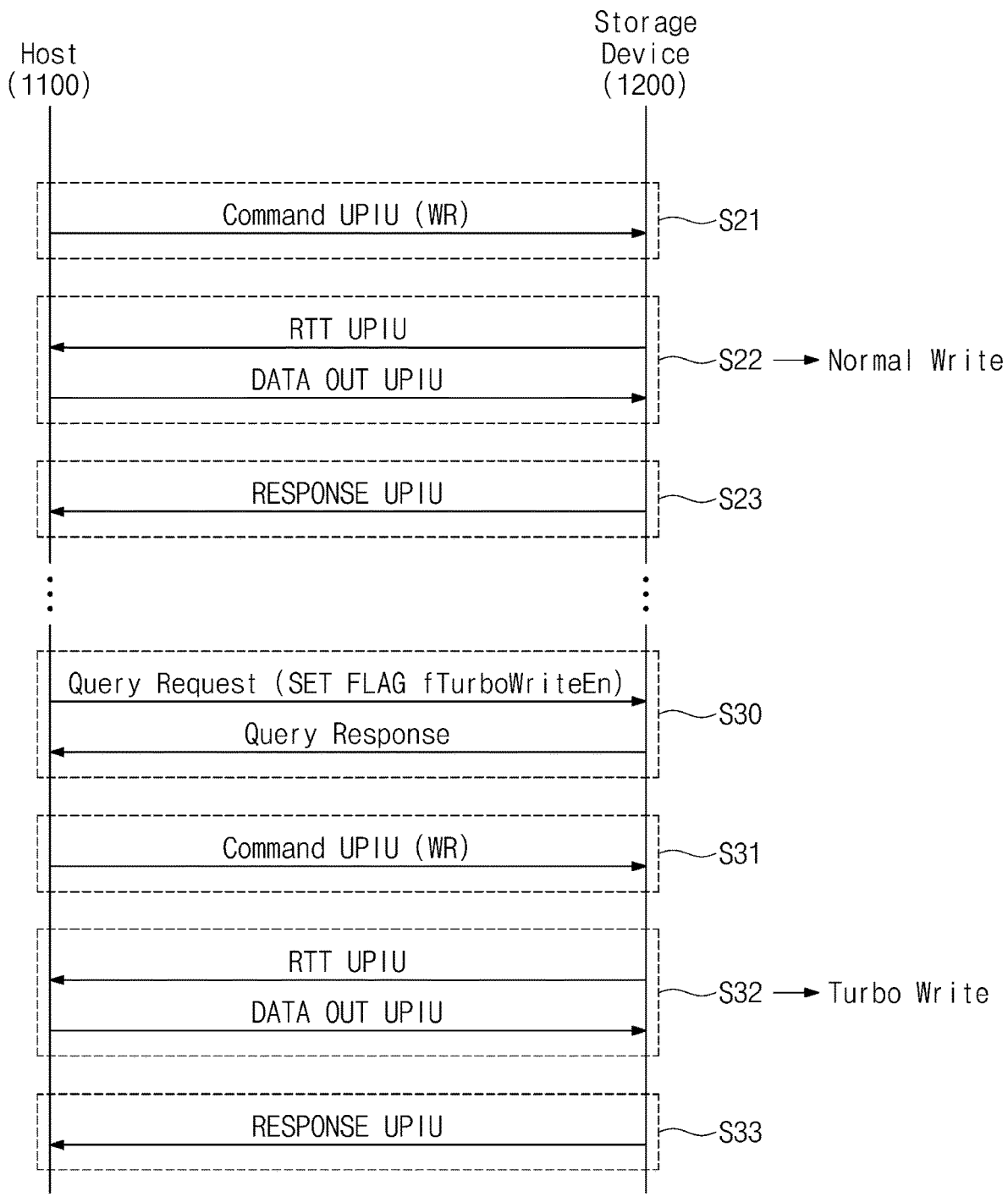
FIG. 6 is a flowchart illustrating an operation of a storage system of FIG. 1.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation 830, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 8.

In an exemplary embodiment of the inventive concept, even though the turbo write function is enabled, in the case where a space of the turbo write buffer TWB is insufficient, the storage device 1200 may write the received write data in the user storage UST.

Figure 7:
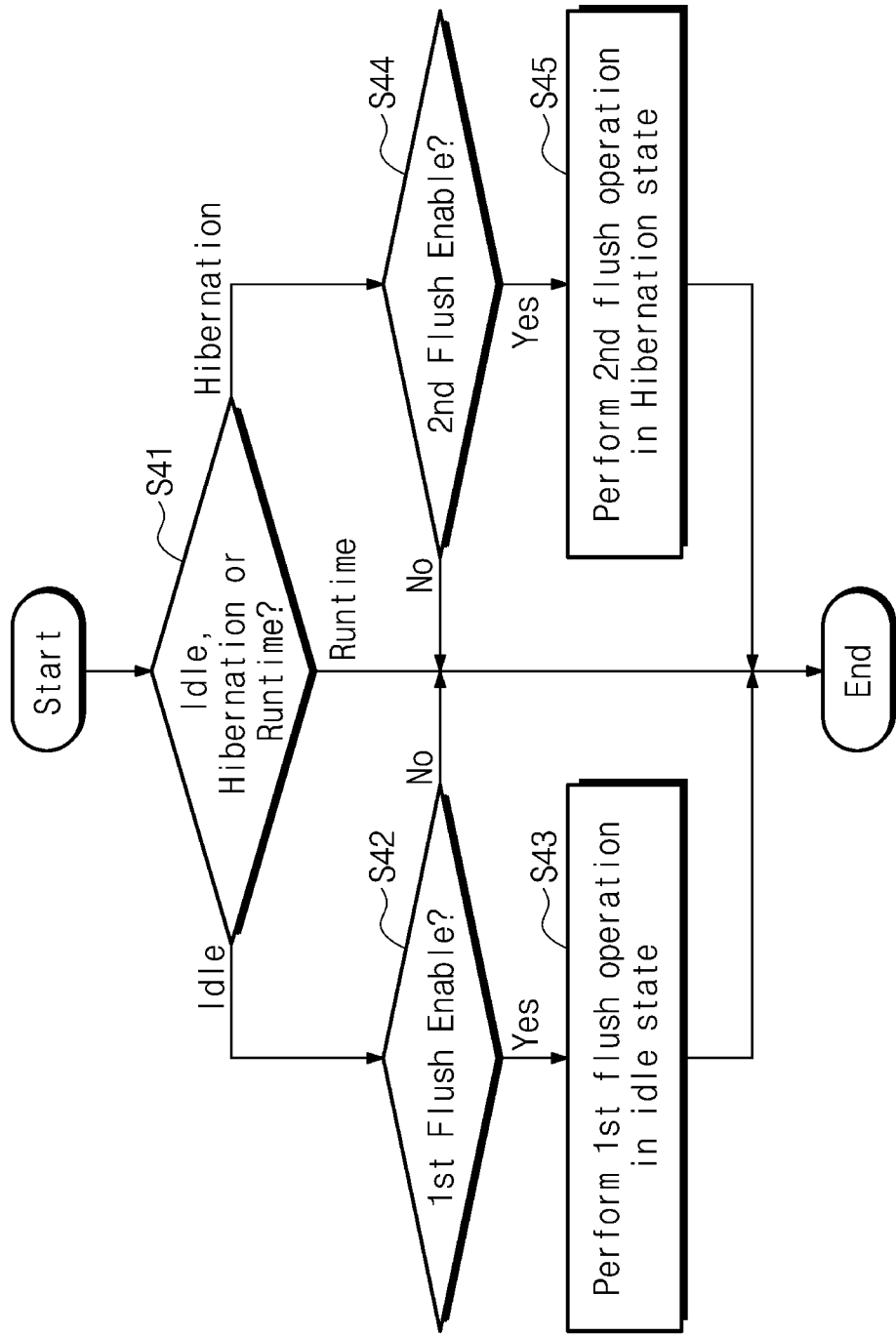
FIG. 7 is a flowchart illustrating an operation of a storage device of FIG. 1.

FIG. 7 is a flowchart illustrating an operation of a storage device of FIG. 1. A flush operation of the storage device 1200 will be described with reference to FIG. 7. Referring to FIGS. 1, 2, and 7, in operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0h", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 7 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 8:
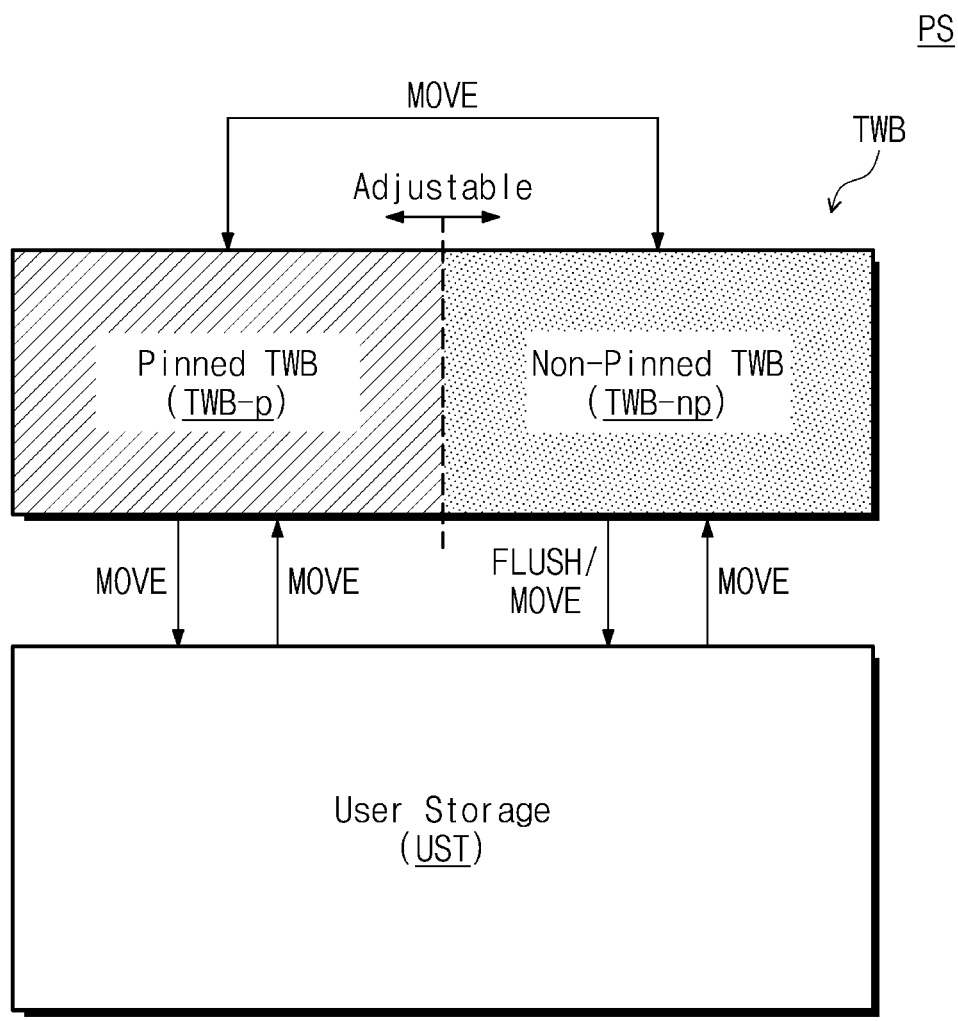
FIG. 8 is a block diagram illustrating a physical storage space of a storage device of FIG. 1.

FIG. 8 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB-np.

In an embodiment, data stored in the pinned turbo write buffer TWB-p is not targeted for a move (e.g., a migrate or a flush) to the user storage UST, and data stored in the non-pinned turbo write buffer TWB-lip may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo mite buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 9:
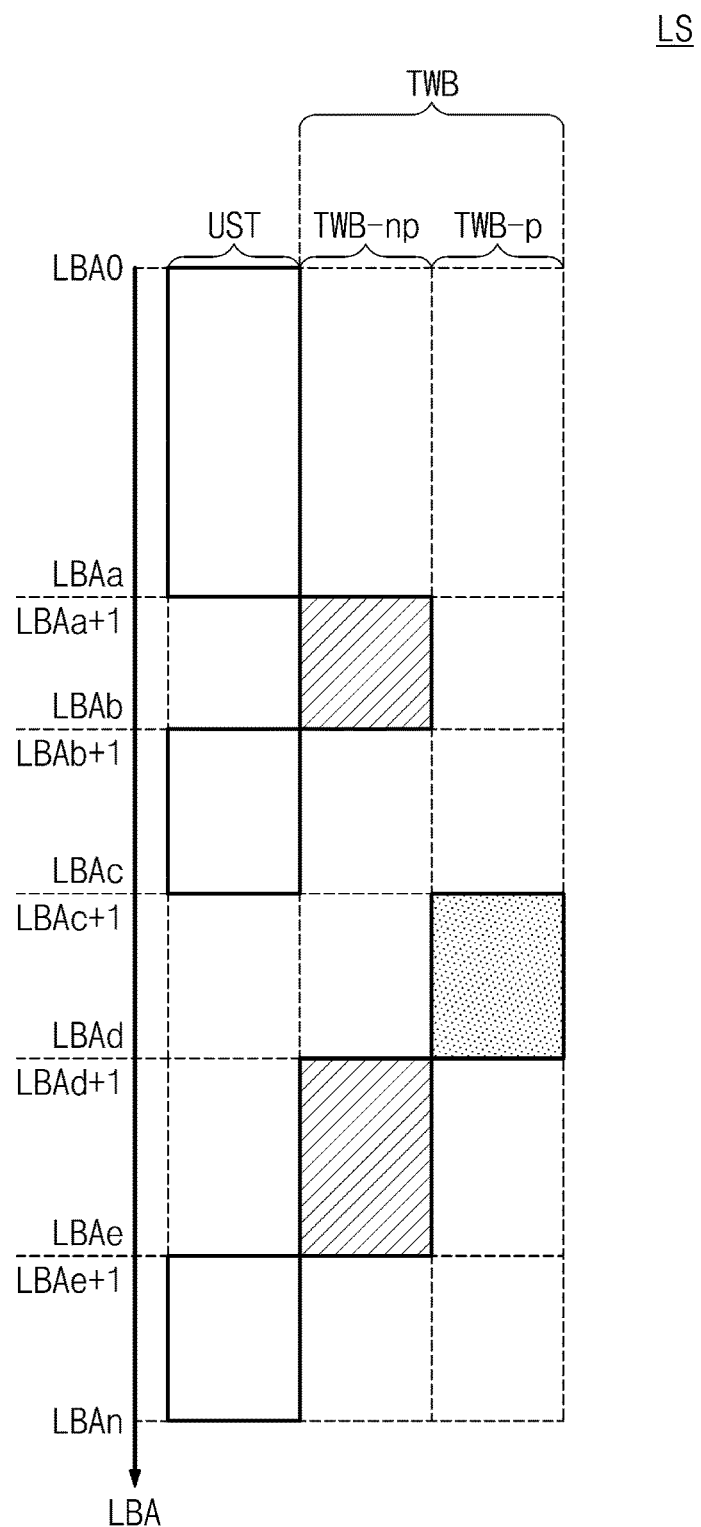
FIG. 9 is a diagram illustrating a logical storage space for a physical storage space of a storage device described with reference to FIG. 8.

FIG. 9 is a diagram illustrating a logical storage space for the physical storage space PS of the storage device 1200 described with reference to FIG. 8. For convenience of description, the embodiment of FIG. 9 will be described with reference to one logical unit. However, the inventive concept may be identically applied to two or more logical units to which the turbo write buffers TWB correspond, or a relationship between logical units and a shared turbo write buffer (e.g., TWB0).

Referring to FIGS. 1 and 9, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np. In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p, in this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UM) information of the pinned turbo write buffer TWB-p and the non-pinned turbo write buffer TWB-np from the storage device 1200 periodically or if necessary.

Figure 10A:
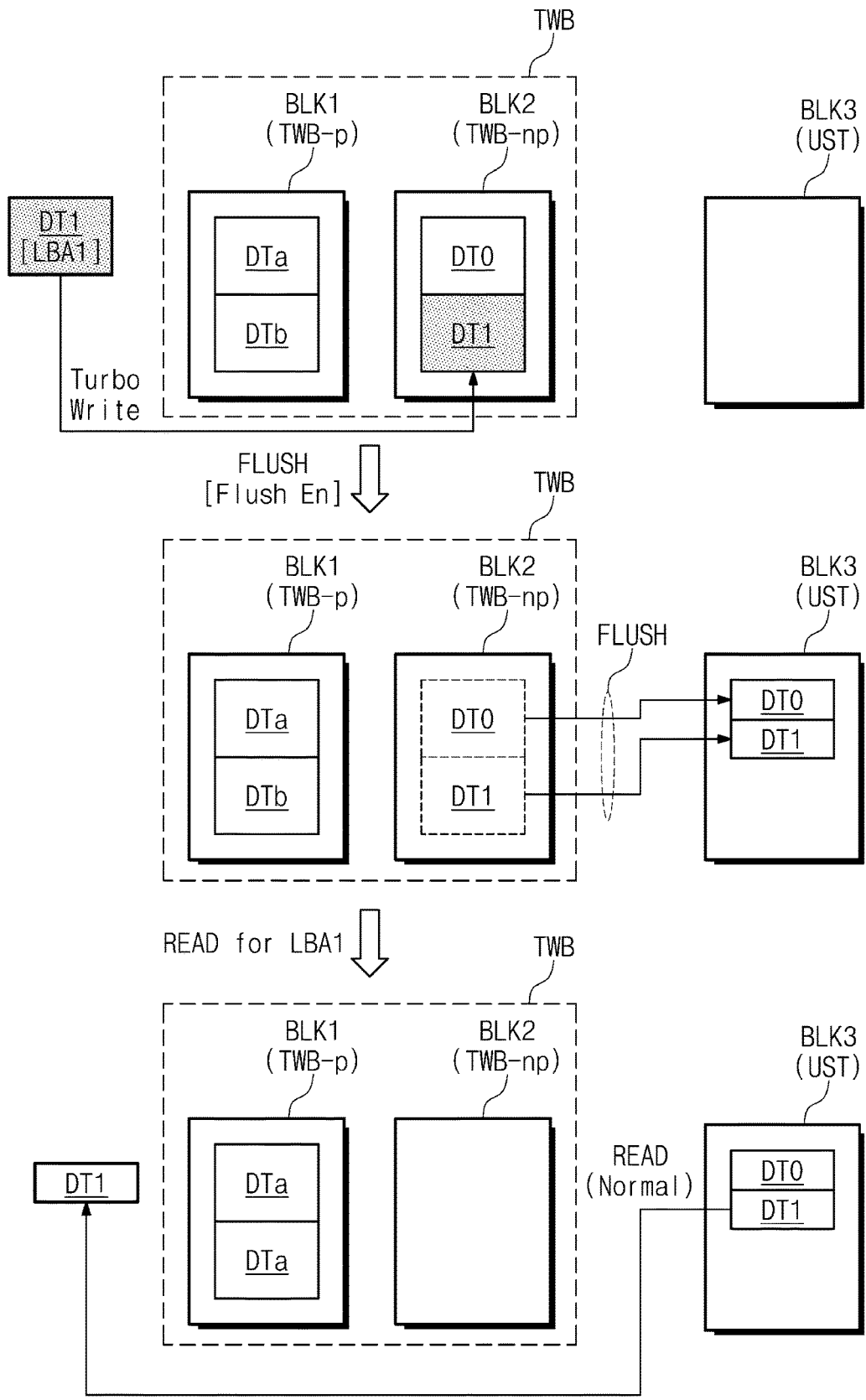
FIGS. 10A and 10B are diagrams illustrating an operation in a physical storage space of a storage device described with reference to FIG. 8.
Figure 10B:
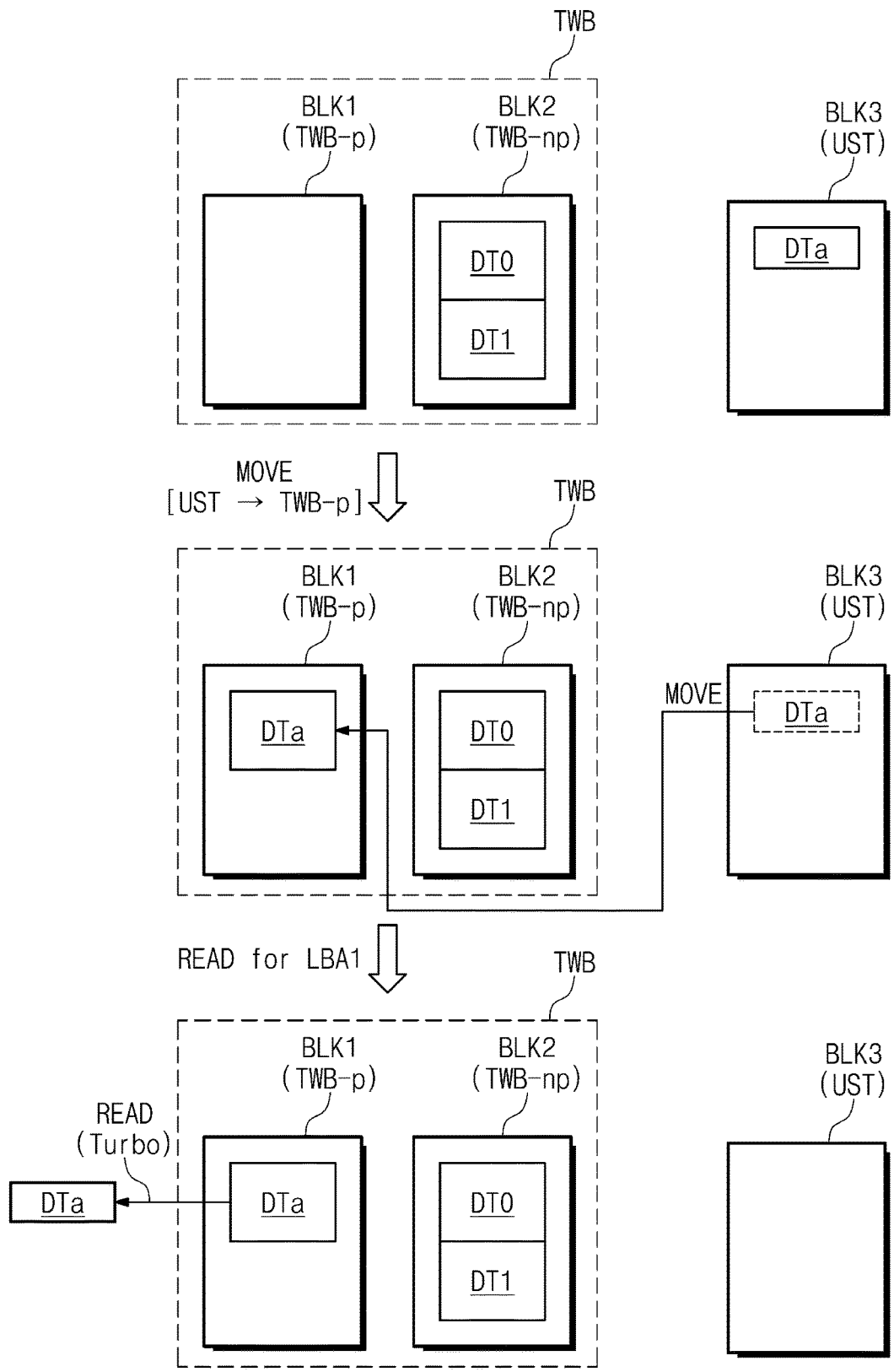

FIGS. 10A and 10B are diagrams illustrating an operation in a physical storage space of a storage device described with reference to FIG. 8. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Deterring to FIGS. 1, 8, and 10A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np).

In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 10A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the user data. DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa. and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data all to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 8, and 10B, the 0-th and first data. DT0 and DT1 may be stored in the second memory block BLK2 of the non-pinned turbo write buffer TWB-np, and the a-th data may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer MB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

Figure 11:
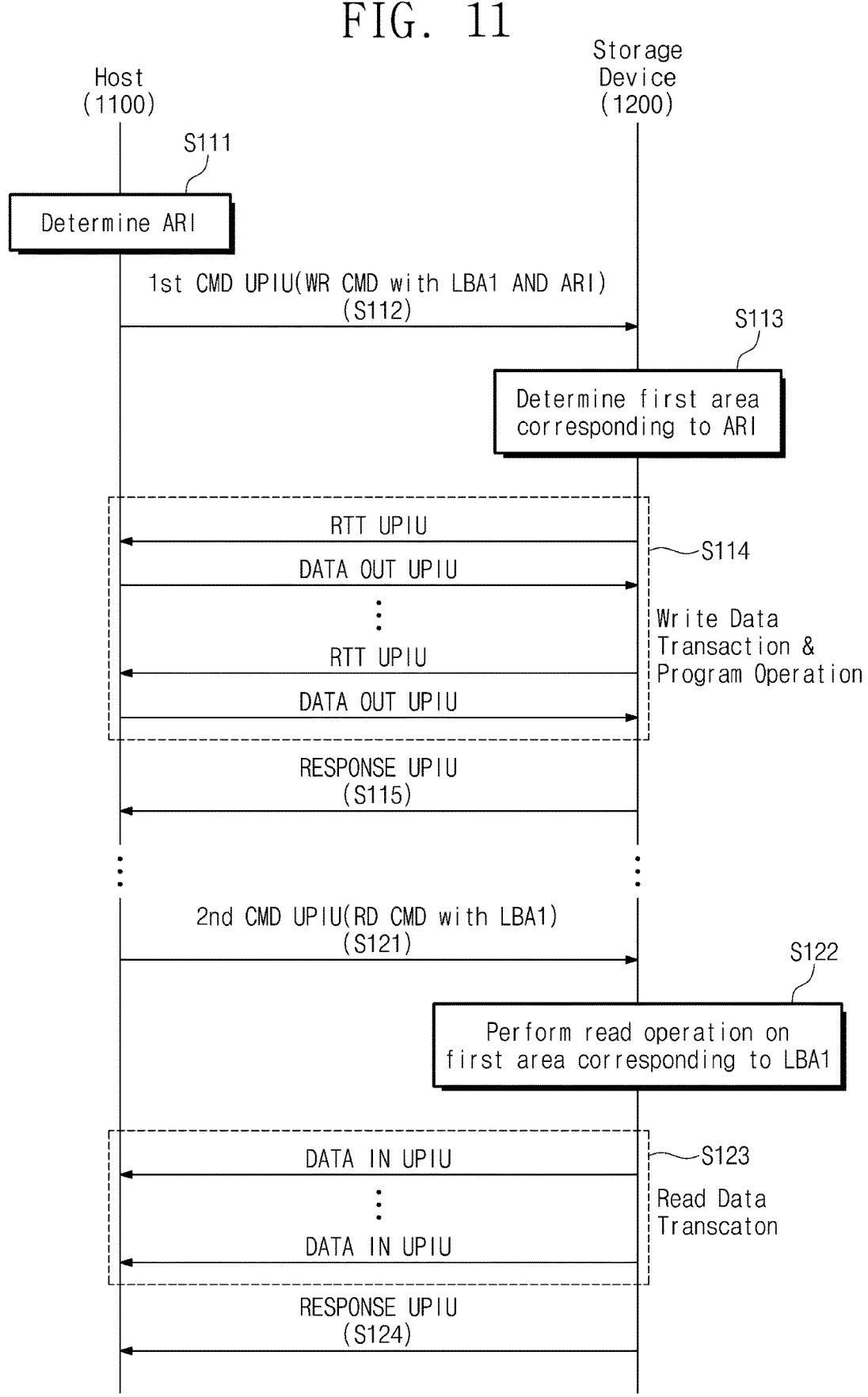
FIG. 11 is a flowchart illustrating an operation of a storage system of FIG. 1.

FIG. 11 is a flowchart illustrating an operation of a storage system of FIG. 1. Referring to FIGS. 1, 8, and 11, in operation S111, the host 1100 may determine area information. For example, the host 1100 may manage attribute or stream information about write data to be written in the storage device 1200. In the case where, depending on the attribute or stream information under management, it is determined that a high-speed operation for the write data is not required (e.g., that the normal read is appropriate), the host 1100 may determine area information ARI such that the write data are written in the user storage UST. Alternatively, when the high-speed operation for the write data is required (e.g., when the turbo read is necessary or is more appropriate), the host 1100 may determine the area information ARI such that the write data are stored in the pinned turbo write buffer TWB-p or the non-pinned turbo write buffer TWB-np.

In an exemplary embodiment of the inventive concept, when a continuous high-speed operation is necessary for the write data, the host 1100 may determine the area information ARI such that the write data are stored in the pinned turbo write buffer TWB-p. When a temporary high-speed operation is necessary for the write data, the host 1100 may set the area information ARI such that the write data are stored in the non-pinned turbo write buffer TWB-tip. The reason for is that data stored in the non-pinned turbo write buffer TWB-np are flushed to the user storage UST by the explicit flush request from the host 1100 and data stored in the pinned turbo write buffer TWB-p are not flushed to the user storage UST by the explicit flush request from the host 1100, as described above. In other words, data stored in the pinned turbo write buffer TWB-p may be maintained in the turbo write buffer TWB for a longer time than data stored in the non-pinned turbo write buffer TWB-np.

In operation S112, the host 1100 may transfer a first command UPIU (hereinafter referred to as "CMD UPIU") to the storage device 1200. The first CMD UPIU may include a write command WR CMD (or a write command descriptor block). The write command WR CMD may include information about a first logical block address LBA1 and the area information ARI.

In operation S113, the storage device 1200 may determine a first area corresponding to the area information ARI in response to the received first CMD UPIU. For example, in the case where the host 1100 sets the area information ARI to store write data in the pinned turbo write buffer TWB-p or the non-pinned turbo write buffer TWB-np, the storage device 1200 may determine a storage space of the pinned turbo write buffer TWB-p or the non-pinned turbo write buffer TWB-np as a first area corresponding to the area information ARI. In the case where the host 1100 sets the area information ARI to store write data in the user storage UST, the storage device 1200 may determine a storage space of the user storage UST as the first area corresponding to the area information ARI.

In an exemplary embodiment of the inventive concept, in the case where the host 1100 sets the area information ARI to store write data in the user storage UST, the first CMD UPIU transferred in operation S112 may not include information about the area information ARI. In this case, the storage device 1200 may determine a storage space of the user storage UST as the first area or may set another storage space to the first area depending on the internal policy.

In operation S114, the host 1100 and the storage device 1200 may perform a write data transaction, and the storage device 1200 may perform a program operation for storing the received write data in the first area. For example, the storage device 1200 may transfer the ready to transfer UPIU (RTT UPIU) to the host 1100, and the host 1100 may transfer the DATA OUT UPIU including the write data to the storage device 1200 in response to the RTT UPIU. The storage device 1200 may store the received write data in the first area corresponding to the area information ARI. In this case, the write data may be data corresponding to the first logical block address LBA1. The storage device 1200 may manage a mapping relationship of the first logical block address LBA1 and a physical address of the first area corresponding to the area information ARI.

When the write data transaction and the program operation are completed, in operation S115, the storage device 1200 may transfer the RESPONSE UPIU to the host 1100. The RESPONSE UPIU transferred in operation S115 may be a response to the first CMD UPIU.

In operation S121, the host 1100 may transfer a second CMD UPIU including a read command RD CMD (or a read command descriptor block) to the storage device 1200. In this case, the read command RD CMD may include information about the first logical block address LBA1.

In operation S122, the storage device 1200 may perform a read operation on the first area to read data corresponding to the first logical block address LBA1. For example, data corresponding to the first logical block address LBA1 may be stored in the first area corresponding to the area information ARI through operation S111 to operation S115. For example, in the case where the first area corresponding to the area information ARI is the pinned turbo write buffer TWB-p or the non-pinned turbo write buffer TWB-np, the storage device 1200 may read data corresponding to the first logical block address LBA1 by performing the turbo read operation on the first area. In the case where the first area corresponding to the area information ARI is the user storage UST, the storage device 1200 may read data corresponding to the first logical block address LBA1 by performing the normal read operation on the first area.

In operation S123, the storage device 1200 may transfer the read data to the host 1100. For example, the storage device 1200 may transfer at least one DATA IN UPIU including the read data to the host 1100. In other words, the storage device 1200 may transfer a plurality of DATA IN UPIUs to the host 1100.

After the read data are completely transferred to the host 1100, in operation S124, the storage device 1200 may transfer the RESPONSE UPIU to the host 1100. The RESPONSE UPIU transferred in operation S124 may be a response to the second CMD UPIU.

Figure 12A:
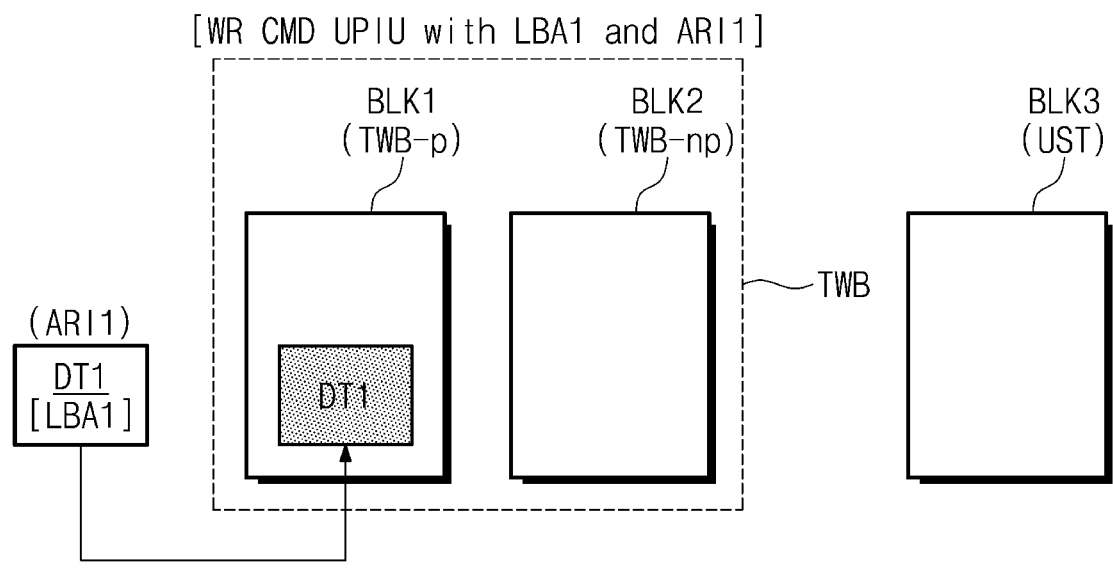
Figure 12B:
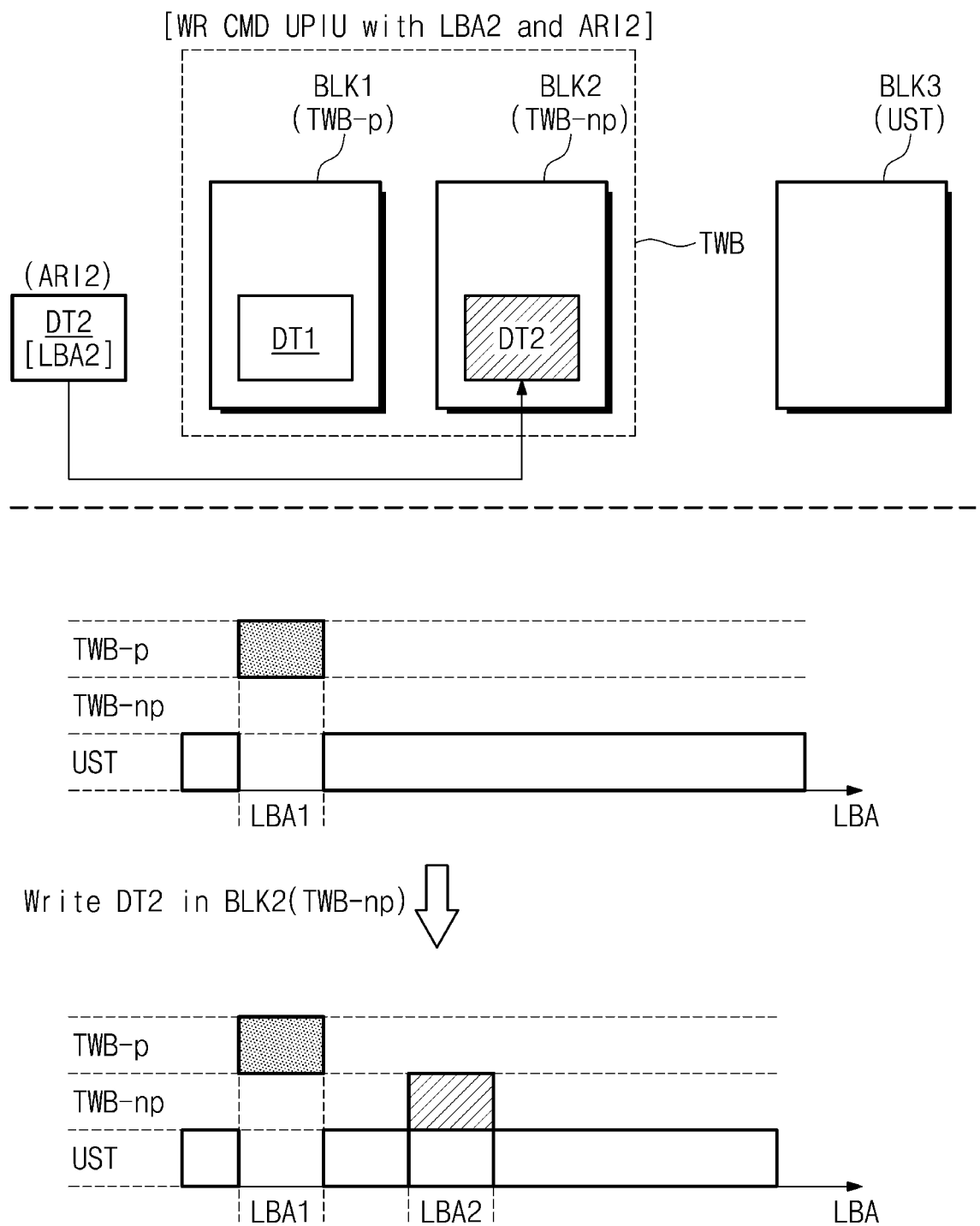

FIGS. 12A to 12C are diagrams for describing a write operation according to the flowchart of FIG. 11 in detail. For convenience of description, as described with reference to FIGS. 10A and 10B, it is assumed that the pinned turbo write buffer TWB-p includes a first memory block BLK1, the non-pinned turbo write buffer TWB-np includes a second memory block BLK2, and the user storage UST includes a third memory block BLK3. However, the inventive concept is not limited thereto.

In addition, for convenience of description, the term "write command URIU" is described. The write command UPIU may refer to the CMD UPIU including a write command descriptor block, but the inventive concept is not limited thereto.

Referring to FIGS. 1, 8, and 12A, the storage device 1200 may receive the write command UPIU WR CMD UPIU including the first logical block address LBA1 and first area information ARI1 from the host 1100. The first area information ARI1 may be information corresponding to the pinned turbo write buffer TWB-p of the storage device 1200.

As such, the storage device 1200 may receive first data DT1 corresponding to the first logical block address LBA1 from the host 1100 and may store the received first data DT1 in the first memory block BLK1 of the pinned turbo write buffer TWB-p corresponding to the first area information ARI1. In this case, as illustrated in FIG. 12A, the storage device 1200 may map the first logical block address LBA1 onto a storage space of the pinned turbo write buffer TWB-p.

Referring to FIGS. 1, 8, and 12B, the storage device 1200 may receive the write command UPIU WR CMD UPIU including a second logical block address LBA2 and second area information ARI2 from the host 1100. The second area information ARI2 may be information corresponding to the non-pinned turbo write buffer TWB-np of the storage device 1200.

As such, the storage device 1200 may receive second data. DT2 corresponding to the second logical block address LBA2 from the host 1100 and may store the received second data DT2 in the second memory block BLK2 of the non-pinned turbo write buffer TWB-np corresponding to the second area information ARI2. In this case, as illustrated in FIG. 12B, the storage device 1200 may map the second logical block address LBA2 onto a storage space of the non-pinned turbo write buffer TWB-np.

Referring to FIGS. 1, 8, and 12C, the storage device 1200 may receive the write command UPIU WR CMD UPIU including a third logical block address LBA3 and third area information ARI3 from the host 1100. The third area information ARI3 may be information corresponding to the user storage UST of the storage device 1200.

As such, the storage device 1200 may receive third data DT3 corresponding to the third logical block address LBA3 from the host 1100 and may store the received third data DT3 in the third memory block BLK3 of the user storage UST corresponding to the third area information ARI3. In this case, as illustrated in FIG. 12C, the storage device 1200 may map the third logical block address LBA3 onto a storage space of the user storage UST.

In an exemplary embodiment of the inventive concept, there may be received the write command UPIU WR CMD UPIU that includes the third logical block address LBA3 and does not include a particular area information ARI. In this case, as described above, the third data DT3 corresponding to the third logical block address LBA3 may be stored in the third memory block BLK3 of the user storage UST.

In an exemplary embodiment of the inventive concept, in response to a read command UPIU from the storage device 1200, the storage device 1200 may perform a read operation (e.g., a turbo read operation or a normal read operation) on an area corresponding to a logical block address included in the read command UPIU.

For example, in the case where the storage device 1200 receives the read command UPIU including the first logical block address LBA1 or the second logical block address LBA2 from the host 1100, the storage device 1200 may read the first data DT1 or the second data DT2 from the pinned turbo write buffer TWB-p or the non-pinned turbo write buffer TWB-np based on mapping information under management. In this case, because the storage device 1200 performs the turbo read operation, a fast operating speed may be secured.

Alternatively, in the case where the storage device 1200 receives the read command UPIU including the third logical block address LBA3 from the host 1100, the storage device 1200 may read the third data DT3 from the user storage UST based on mapping information under management. In this case, because the storage device 1200 performs the normal read operation, an operating speed may be relatively slow compared to the turbo read operation described above.

As described above, the host 1100 of the storage system 1000 according to an exemplary embodiment of the inventive concept may determine an area (e.g., the pinned turbo write buffer TWB-p, the non-pinned turbo write buffer TWB-np, and the user storage UST) to which write data are to be written and may set the area information ARI based on the determined area. The area information ARI may be included in the write command UPIU to be provided to the storage device 1200. The storage device 1200 may write the write data in an area corresponding to the area information ARI and may manage a mapping relationship between a logical block address of the write data and a physical address of the area corresponding to the area information ARI.

Figure 13B:
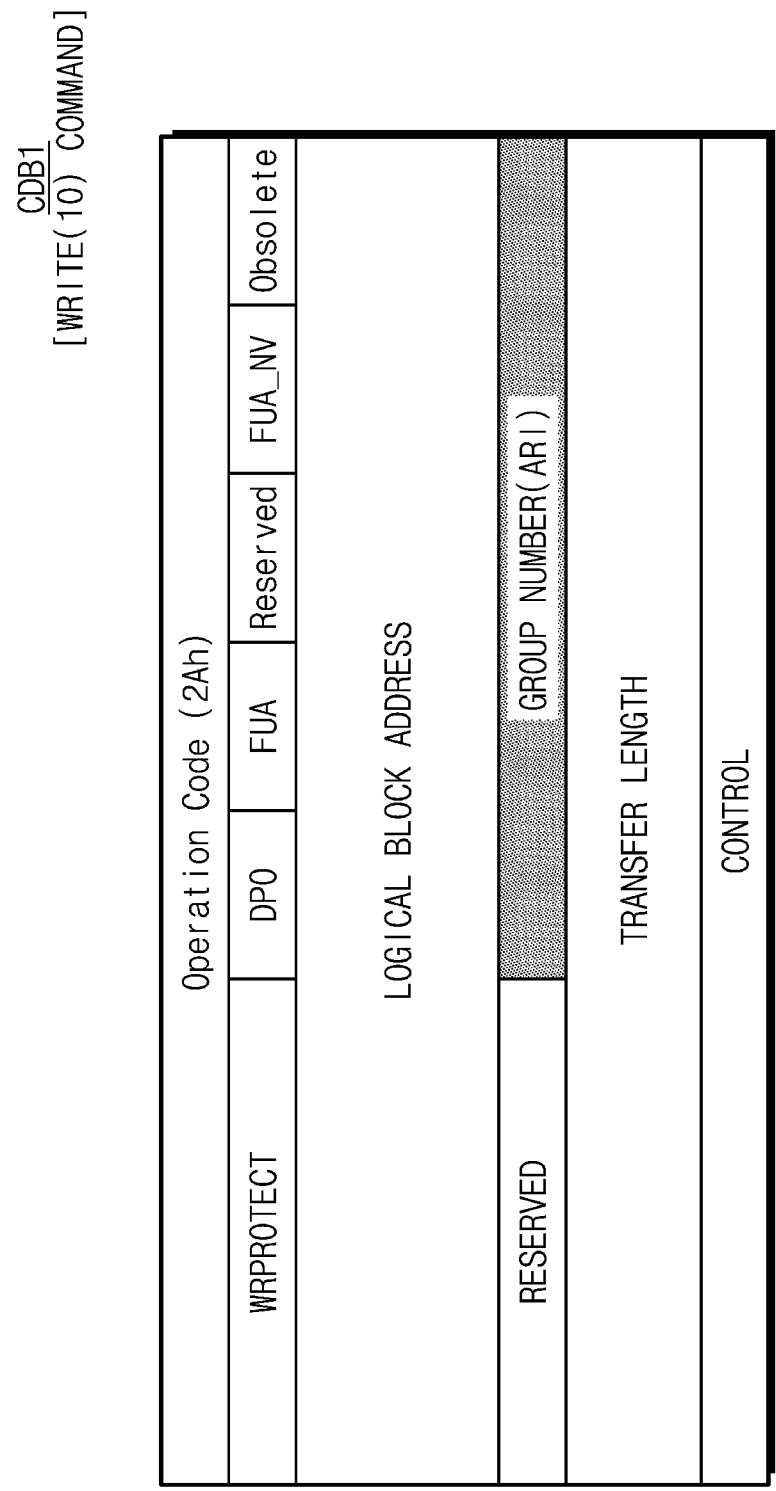

FIGS. 13A and 13B are diagrams for describing a method of setting area information at a write command UPIU. A schematic data structure of a write command UPIU will be described with reference to FIGS. 13A and 13B, but the inventive concept is not limited thereto. In an exemplary embodiment of the inventive concept, data structures illustrated in FIGS. 13A and 13B may be similar to a data structure defined in the UFS interface or protocol conforming to the JEDEC standard. For convenience, an additional description will be omitted with regard to components or fields that may not be needed to describe an embodiment of the inventive concept.

Referring to FIGS. 1, 13A, and 13B, the host 1100 may transfer the CMD UPIU illustrated in FIG. 13A to the storage device 1200. The CMD UPIU may include the following fields: Trans Type, Flags, LUN (Logical Unit Number), Task Tag, IID/CST (Initiation Device Identifier/Command Set Type), EHS (Error History Source) Length, Data Segment Length, Expected Data Transfer Length, Command Descriptor Block (CDB), Header, Reserved, etc.

In an exemplary embodiment of the inventive concept, the area information ARI determined by the host 1100 may be set at the "Flags" field of the CMD UPIU. In other words, particular values of the "Flags" field may correspond to the pinned turbo write buffer TWB-p, the non-pinned turbo write buffer TWB-np, and the user storage UST of the storage device 1200, respectively. In other words, that a value of the "Flags" field is a first value may mean that the area set by the host 1100 is the pinned turbo write buffer TWB-p; that a value of the "Flags" field is a second value may mean that the area set by the host 1100 is the non-pinned turbo write buffer TWB-np; and that a value of the "Flags" field is a third value may mean that the area set by the host 1100 is the user storage UST, but the inventive concept is not limited thereto.

In an exemplary embodiment of the inventive concept, the storage device 1200 may further include any other areas, as well as the pinned turbo write buffer TWB-p, the non-pinned turbo write buffer TWB-np, and the user storage UST described with reference to FIG. 8. For example, the storage device 1200 may include a plurality of turbo write buffers TWB. The plurality of turbo write buffers TWB may be different from each other in an operating speed, the number of bits per cell, a reliability, a compression rate, etc. Each or at least one of the plurality of turbo write buffers TWB may include the pinned turbo write buffer TWB-p and the non-pinned turbo write buffer TWB-np. Accordingly, kinds and the number of values to be set at the "Flags" field of the CMD UPIU to set the area information ARI may vary depending on a scheme to implement various areas included in the storage device 1200.

In an exemplary embodiment of the inventive concept, the area information ARI may be included in a particular field of the command descriptor block CDB. For example, as illustrated in FIG. 13B, a first command descriptor block CDB1 may be associated with a write command WRITE(10) COMMAND. The first command descriptor block CDB1 may include the following fields: Operation Code, WRPROTECT (Write Protection), DPO (Disable Page Out), FUA (Force Unit Access), FUA_NV (Force Unit Access), Obsolete, LOGICAL BLOCK ADDRESS, GROUP NUMBER, TRANSFER LENGTH, CONTROL, Reserved. A value of the "Operation Code" field of the first command descriptor block CDB1 being a write command may be "2Ah".

The area information ARI determined by the host 1100 may be included in the "GROUP NUMBER" field. For example, the "GROUP NUMBER" field may include a context identifier Context ID for write data. An area (e.g., one of the pinned turbo write buffer TWB-p, the non-pinned turbo write buffer TWB-np, and the user storage UST) to which data are to be stored may be determined based on the context identifier Context ID set at the "GROUP NUMBER" field.

For example, data corresponding to a first context identifier may be stored at the pinned turbo write buffer TWB-p, data corresponding to a second context identifier may be stored at the non-pinned turbo write buffer TWB-np, and data corresponding to a third context identifier may be stored at the user storage UST. The host 1100 may determine a context identifier based on the area information ARI and may set the determined context identifier at the "GROUP NUMBER" field.

In an exemplary embodiment of the inventive concept, the number of context identifiers that are able to be set at the "GROUP NUMBER" field may be more than the number of divided areas of the storage device 1200. In other words, a plurality of first context identifiers may correspond to the pinned turbo write buffer TWB-p, a plurality of second context identifiers may correspond to the non-pinned turbo write buffer TWB-np, and a plurality of third context identifiers may correspond to the user storage UST.

As described above, the host 1100 of the storage system 1000 according to an exemplary embodiment of the inventive concept may determine an area to which write data are to be stored and may set the area information ARI about the determined area. In this case, the area information ARI may be included in the "Flags" field of the CMD UPIU or may be set as a context identifier at the "GROUP NUMBER" field of the write command descriptor block.

Figure 14:
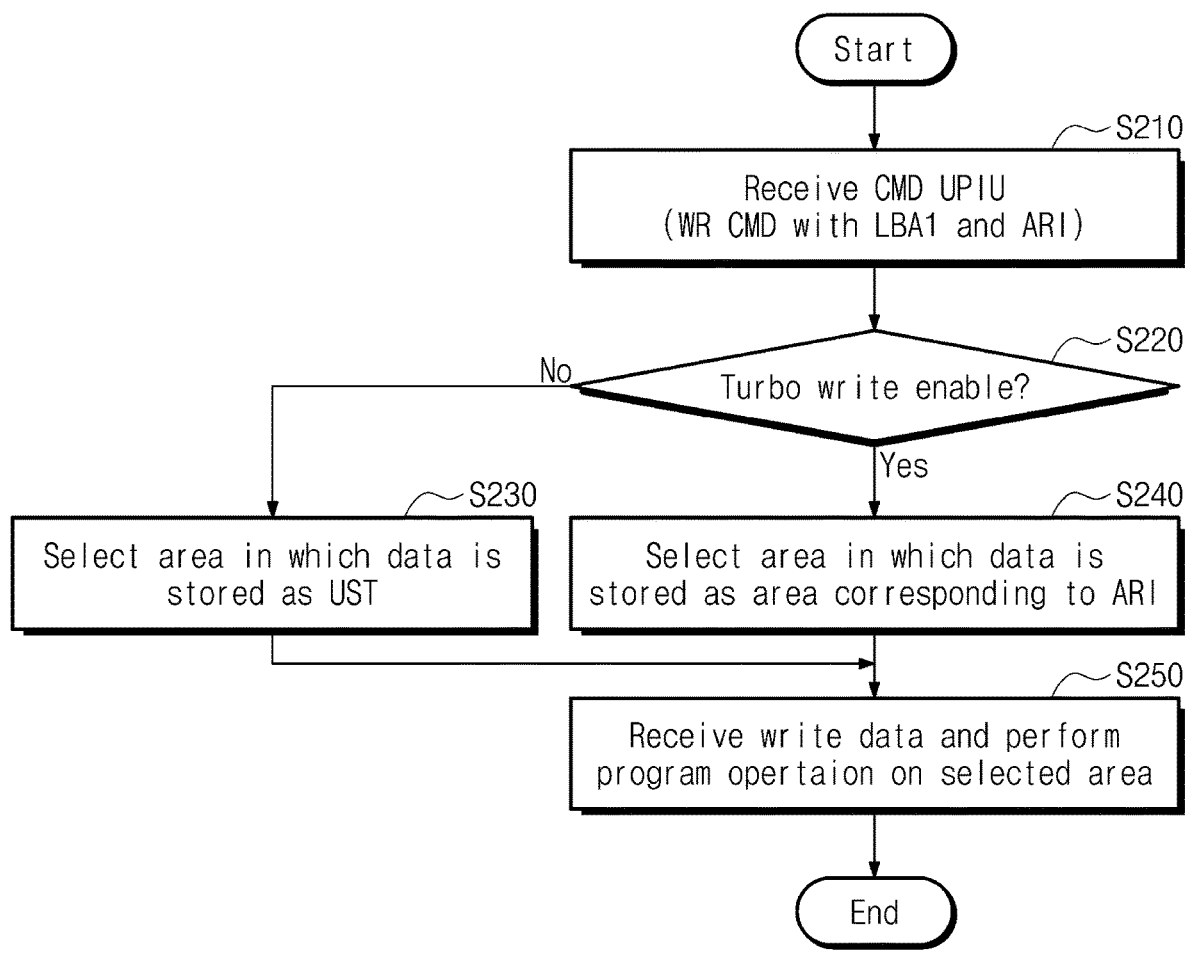
FIG. 14 is a flowchart illustrating an operation of a storage device of FIG. 1.

FIG. 14 is a flowchart illustrating an operation of a storage device of FIG. 1. In the embodiment described with reference to FIGS. 11 to 13B, regardless of whether the turbo write function (or a turbo write buffer function) is enabled, the storage device 1200 may store write data in an area (e.g., TWB-p, TWB-np, or UST) corresponding to the area information ARI when the write command UPIU from the host 1100 includes the area information ARI. However, the inventive concept is not limited thereto. For example, the storage device 1200 may be configured to perform the operation described with reference to FIGS. 11 to 13B only when the turbo write function is enabled.

For example, referring to FIGS. 1 and 14, in operation S210, the storage device 1200 may receive the CMD UPIU from the host 1100. For example, the CMD UPIU may include the write command WR CMD including the first logical block address LBA1 and the area information ARI.

In operation S220, the storage device 1200 may determine whether the turbo write function is enabled. How to enable the turbo write function is described with reference to FIG. 6, and thus, additional description will be omitted to avoid redundancy.

When it is determined that the turbo write function is not enabled, in operation S230, the storage device 1200 selects the user storage UST as an area in which the data received from the host 1100 are to be stored. When it is determined that the turbo write function is enabled, in operation S240, the storage device 1200 selects an area corresponding to the area information ARI as the area in which the data received from the host 1100 are to be stored.

In operation S250, the storage device 1200 may receive data corresponding to the first logical block address LBA1 from the host 1100 and may perform a program operation to store the received data in the selected area.

In other words, when the turbo write function is not enabled, regardless oaf the area information ARI, the storage device 1200 may store the write data received from the host 1100 in the user storage UST. When the turbo write function is enabled, the storage device 1200 may store the write data in an area corresponding to the area information ARI. However, the inventive concept is not limited thereto. For example, as described above, the storage device 1200 may store the write data based on the area information ARI, regardless of whether the turbo write function is enabled.

In addition, in the case where the CMD UPIU received from the host 1100 does not include the area information ARI and the turbo write function of the storage device 1200 is enabled, the storage device 1200 may preferentially write the write data received from the host 1100 in the non-pinned turbo write buffer TWB-np. In this case, the storage device 1200 may manage and maintain a mapping relationship of a logical block address of the stored write data and a physical address of the non-pinned turbo write buffer TWB-np.

FIG. 15 is a flowchart illustrating an operation of a storage system of FIG. 1. Referring to FIGS. 1, 8, and 15, in operation S311, the host 1100 may determine a logical block address range. For example, the host 1100 may determine a portion, which is to be assigned to the pinned turbo write buffer TWB-p or the non-pinned turbo write buffer TWB-np, of the entire logical block address range used to manage a storage space of the storage device 1200.

For example, in the above embodiment, in the case of writing the write data, the host 1100 may determine whether a logical block address corresponding to the write data is associated with any area. In contrast, in the embodiment of FIG. 14, the host 1100 may determine, in advance, a logical block address range to be used for the pinned turbo write buffer TWB-p or the non-pinned turbo write buffer TWB-np. In an exemplary embodiment of the inventive concept, the host 1100 may set a logical block address range to be used for the user storage UST.

In operation S312, the host 1100 may transfer a first CMD UPIU to the storage device 1200. The first CMD UPIU may include a logical block address range LBA_rg and range area information ARI_rg corresponding to the logical block address range LBA_rg. The logical block address range LBA_rg may be a partial range, which is determined by the host 1100 to be used as a particular area (e.g., one of the pinned turbo write buffer TWB-p, non-pinned turbo write buffer TWB-np, and the user storage UST), of the entire logical block address range. The range area information ARI_rg may be information about a particular area to be defined by the logical block address range LBA_rg.

For example, the first CMD UPIU may have the data structure or the data format illustrated in FIGS. 13A and 13B. In this case, the range area information ARI_rg may be included in the "Flags" field of the CMD UPIU of FIG. 13A or the "GROUP NUMBER" field of the first command descriptor block CDB1 of FIG. 13B, This is similar to the area information ARI described with reference to FIGS. 13A and 13B, and thus, additional description will be omitted to avoid redundancy.

In an exemplary embodiment of the inventive concept, the logical block address range LBA_rg may be set through the "LOGICAL ADDRESS" field and the "TRANSFER LENGTH" field of FIG. 13B. For example, a start logical block address of the logical block address range LBA_rg may be set at the "LOGICAL ADDRESS" field of FIG. 13B, and a size of the logical block address range LBA_rg (e.g., a range size) may be set at the "TRANSFER LENGTH" field. In other words, the storage device 1200 may identify the logical block address range LBA_rg based on the "LOGICAL ADDRESS" field and the "TRANSFER LENGTH" field.

As described above, a configuration in which the logical block address range LBA_rg and the range area information ARI_rg are transferred to the storage device 1200 by using the write command. UPIU is an exemplary embodiment of the inventive concept, and the inventive concept is not limited thereto.

In operation S313, the storage device 1200 may assign an area corresponding to the first logical block address range LBA_rg to a first area corresponding to the range area information ARI_rg in response to the CMD UPIU received from the host 1100. For example, in the case where the range area information ARI_rg indicates the pinned turbo write buffer TWB-p, the storage device 1200 may map the logical block address range LBA_rg onto a storage space of the pinned turbo write buffer TWB-p.

In operation S315, the storage device 1200 may transfer the RESPONSE UPIU to the host 1100. The RESPONSE UPIU transferred in operation S315 may be a response to the first CMD UPIU.

In an exemplary embodiment of the inventive concept, even though the first CMD UPIU includes the write command WR CMD or the write command descriptor block, the data transaction between the host 1100 and the storage device 1200 may be omitted. The reason for is that the first CMD UPIU is used to assign the logical block address range LBA_rg, to a particular area. In other words, the host 1100 and the storage device 1200 may determine whether the received write command UPIU is for a data write or for assigning a logical block address range, based on a particular field (e.g., a field including the range area information ARI_rg) of the write command UPIU.

Afterwards, in operation S321, the host 1100 may transfer a second CMD UPIU. The second CMD UPIU may include the write command WR CMD or the write command descriptor block including the first logical block address LBA1. In an exemplary embodiment of the inventive concept, the second CMD UPIU may be similar to the first CMD UPIU in a data structure. However, a particular field of the first CMD UPIU may include the range area information ARI_rg, while the second CMD UPIU may not include the range area information ARI_rg. In other words, the second CMD UPIU may be a normal write command UPIU.

In operation S322, in response to the second CMD UPIU, the storage device 1200 may perform a write data transaction with the host 1100 and may store the received write data in the first area. For example, the first logical block address LBA1 may be included in the logical block address range LBA_rg received in operation S312. In this case, the storage device 1200 may store the write data corresponding to the first logical block address LBA1 in the first area assigned to the logical block address range LBA_rg as described above. For example, in the case where the logical block address range LBA_rg is assigned to a storage space of the pinned turbo write buffer TWB-p and the first logical block address LBA1 is included in the logical block address range LBA_rg, the storage device 1200 may write the data corresponding to the first logical block address LBA1 in the pinned turbo write buffer TWB-p.

For brevity of illustration, one RTT UPIU and one DATA OUT UPIU are transferred in operation S322 of FIG. 15, but the inventive concept is not limited thereto. For example, as in the description given with reference to FIG. 11, in operation S322, the host 1100 and the storage device 1200 may exchange a plurality of RTT UPIUs and a plurality of DATA OUT UPIUs.

After the program operation is completed, in operation S323, the storage device 1200 may transfer the RESPONSE UPIU to the host 1100. The RESPONSE UPIU transferred in operation S323 may be a response to the second CMD UPIU.

Afterwards, in operation S331, the host 1100 may transfer a third CMD UPIU to the storage device 1200. The third CMD UPIU may include the read command RD CMD or the read command descriptor block including the first logical block address LBA1.

In operation S332, the storage device 1200 may perform the turbo read operation or the normal read operation on the first area in response to the third CMD UPIU thus received. For example, in the case where the first logical block address LBA1 is included in the logical block address range LBA_rg and the range area information ARI_rg corresponds to the pinned turbo write buffer TWB-p or the non-pinned turbo write buffer TWB-np, the storage device 1200 may perform the turbo read operation on the pinned turbo write buffer TWB-p or the non-pinned turbo write buffer TWB-np to read data corresponding to the first logical block address LBA1. Alternatively, in the case where the first logical block address LBA1 is included in the logical block address range LBA_rg and the range area information ARI_rg corresponds to the user storage UST, the storage device 1200 may perform the normal read operation on the user storage UST to read data corresponding to the first logical block address LBA1.

Afterwards, in operation S333, the storage device 1200 may transfer the read data to the host 1100 through the DATA IN UPIU. For brevity of illustration, one DATA IN UPIU is transferred in operation S333 of FIG. 15, but the inventive concept is not limited thereto. For example, as in the description given with reference to FIG. 11, a plurality of DATA IN UPIUs may be provided from the storage device 1200 to the host 1100 until all the read data are transferred to the host 1100.

After all the read data are transferred to the host 1100, in operation S334, the storage device 1200 may transfer the RESPONSE UPIU to the host 1100. The RESPONSE UPIU transferred in operation S334 may be a response to the third CMD UPIU.

FIGS. 16A and 16B are diagrams for describing a logical block address range assigning operation according to the flowchart of FIG. 15. For convenience of description, as described with reference to FIGS. 10A and 10B or FIGS. 12A to 12C, it is assumed that the pinned turbo write buffer TWB-p includes the first memory block BLK1, the non-pinned turbo write buffer TWB-np includes the second memory block BLK2, and the user storage UST includes the third memory block BLK3. However, the inventive concept is not limited thereto.

Below, for convenience of description, the term "write command UPIU" is used. The write command UPIU may refer to the CND UPIU including a write command descriptor block, but the inventive concept is not limited thereto.

Referring to FIGS. 1, 8, 15, 16A, and 16B, the storage device 1200 may receive a first write command UPIU from the host 1100. The first write command UPIU may include a first logical block address range LBA_rg1 and first range area information ARI_rg1. As described above, because the storage device 1200 receives the first write command WR CMD (e.g., the CMD UPIU including a write command descriptor block) from the host 1100 but the first write command UPIU is the CMD UPIU for setting the logical block address range LBA_rg (e.g., the CMD UPIU in which the range area information ARI_rg is included at a particular field), the storage device 1200 may not perform a separate write operation.

The first range area information ARI_rg1 may include information about the pinned turbo write buffer TWB-p. Accordingly, as illustrated in FIG. 16A, in response to the first write command UPIU, the storage device 1200 may assign an area corresponding to the first logical block address range LBA_rg1 to the pinned turbo write buffer TWB-p. For example, the storage device 1200 may map the first logical block address range LBA_rg1 onto a physical address of a storage space of the pinned turbo write buffer TWB-p and may manage or maintain this mapping relationship. This is illustrated in the lower portion of FIG. 16A which shows the first logical block address range LBA_rg1 associated with the pinned turbo write buffer TWB-p.

Afterwards, as shown in FIG. 16B, the storage device 1200 may receive a second write command UPIU from the host 1100. The second write command UPIU may include a second logical block address range LBA_rg2 and second range area information ARI_rg2. As in the above description, the storage device 1200 may not perform a separate write operation in response to the second write command UPIU.

The second range area information ARI_rg2 may include information about the non-pinned turbo write buffer TWB-np. Accordingly, as illustrated in FIG. 16B, in response to the second write command UPIU, the storage device 1200 may assign an area corresponding to the second logical block address range LBA_rg2 to the non-pinned turbo write buffer TWB-np. For example, the storage device 1200 may map the second logical block address range LBA_rg2 onto a physical address of a storage space of the non-pinned turbo write buffer TWB-np and may manage or maintain this mapping relationship. This is illustrated in the lower portion of FIG. 16B which shows the second logical block address range LBA_rg2 associated with the non-pinned turbo write buffer TWB-np.

Figure 17A:
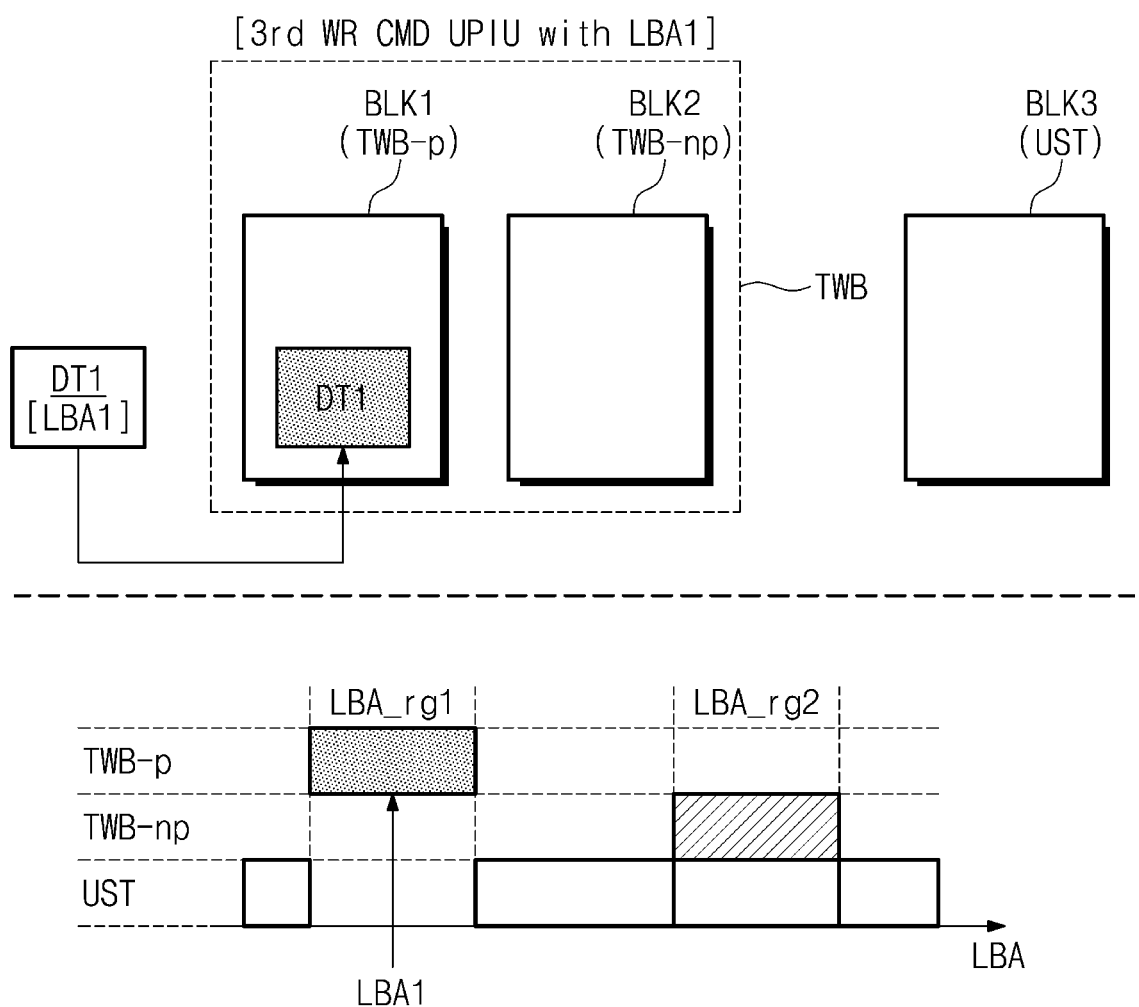
Figure 17B:
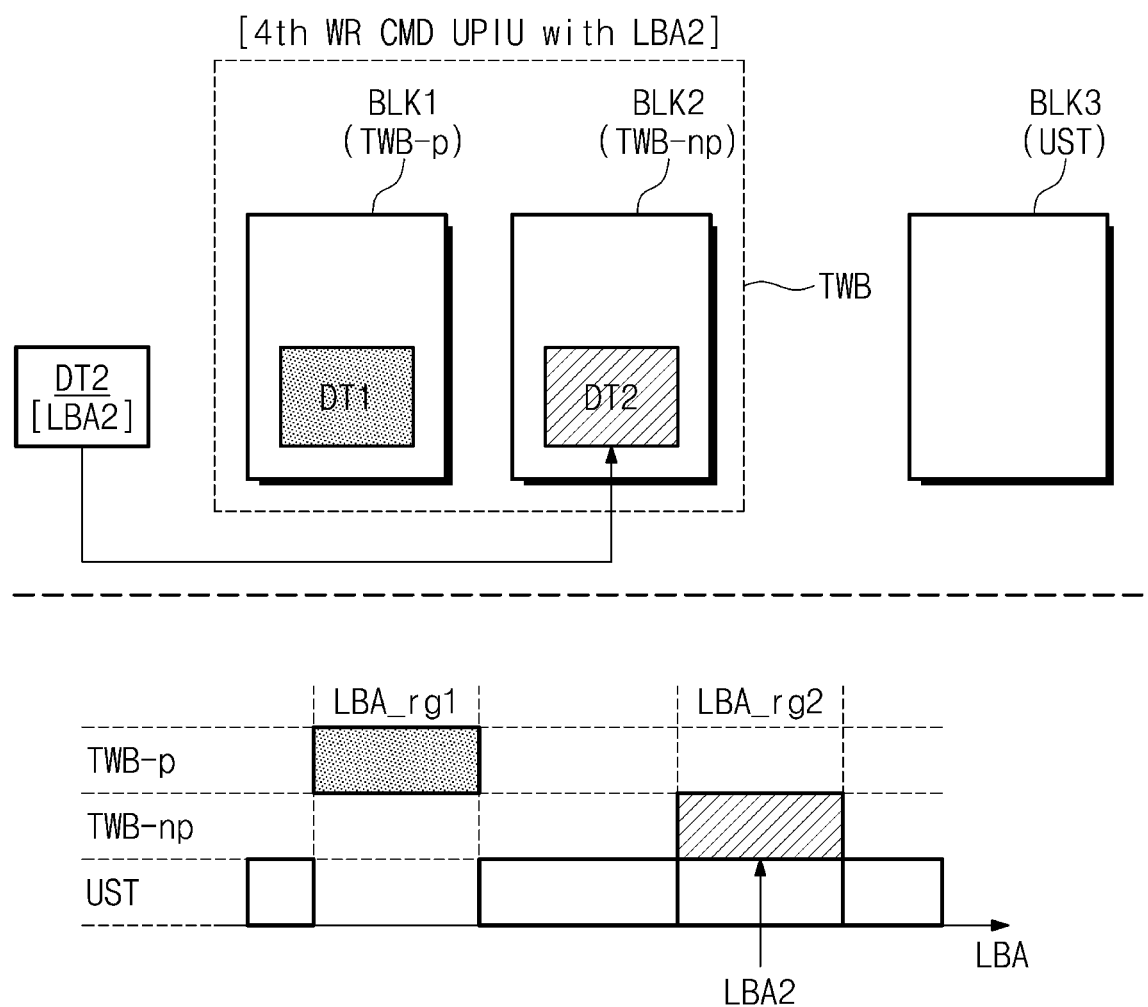

FIGS. 17A to 17C are diagrams for describing a write operation according to the flowchart of FIG. 15. For convenience of description, it is assumed that the storage device 1200 completes the assignment of the logical block address ranges LBA-rg1 and LBA-rg2, as illustrated in FIG. 16B, before a write operation to be described with reference to FIGS. 17A to 17C. In other words, the storage device 1200 may manage or maintain the mapping relationship illustrated in FIG. 16B.

Referring to FIGS. 1, 8, 17A, 17B, and 17C, the storage device 1200 may perform the write operation on the pinned turbo write buffer TWB-p, the non-pinned turbo write buffer TWB-np, or the user storage UST based on a logical block address included in the write command UPIU received from the host 1100.

As illustrated in FIG. 17A, the storage device 1200 may receive a third write command UPIU including the first logical block address LBA1 from the host 1100. In an exemplary embodiment of the inventive concept, because the third write command UPIU does not include the range area information ARI_rg, the storage device 1200 may perform the write operation in response to the third write command UPIU.

For example, the first logical block address LBA1 may be included in the first logical block address range LBA_rg1. In this case, the storage device 1200 may receive the first data DT1 corresponding to the first logical block address LBA1 from the host 1100, and the received first data DT1 may be written in the first memory block BLK1 of the pinned turbo write buffer TWB-p.

Alternatively, as illustrated in FIG. 17B, the storage device 1200 may receive a fourth write command UPIU including the second logical block address LBA2 from the host 1100. In an exemplary embodiment of the inventive concept, because the fourth write command UPIU does not include the range area information ARI_rg, the storage device 1200 may perform the write operation in response to the fourth write command UPIU.

For example, the second logical block address LBA2 may be included in the second logical block address range LBA_rg2. In this case, the storage device 1200 may receive the second data DT2 corresponding to the second logical block address LBA2 from the host 1100 and may write the received second data DT2 in the non-pinned turbo write buffer TWB-np.

In an exemplary embodiment of the inventive concept, as illustrated in FIG. 17C, the storage device 1200 may receive a fifth write command UPIU. The fifth write command UPIU may include the third logical block address LBA3 and the first area information ARI1. The third logical block address LBA3 may not be included in the first logical block address range LBA_rg1 and the second logical block address range LBA_rg2. In other words, the third logical block address LBA3 may be associated with a storage space of the user storage UST.

However, the fifth write command UPIU may further include the first area information ARI1. The first area information ARI1 may include information about the pinned turbo write buffer TWB-p. In this case, as in the description given with reference to FIG. 12A, the storage device 1200 may receive third data DT3 corresponding to the third logical block address LBA3 from the host 1100, may write the received third data DT3 in the pinned turbo write buffer TWB-p, may map the third logical block address LBA3 onto a physical address of the pinned turbo write buffer TWB-p, and may maintain and manage the mapping relationship.

In addition, in the embodiment of FIG. 17C, in the case where a fifth write command UPIU including the third logical block address LBA3 does not include the first area information ARI1, the storage device 1200 may write the third data DT3 corresponding to the third logical block address LBA3 in the user storage UST.

According to the above-described embodiments of the inventive concept, the host 1100 of the storage system 1000 may determine, in advance, a logical block address range corresponding to the pinned turbo write buffer TWB-p, the non-pinned turbo write buffer TWB-np, or the user storage UST and may provide range area information and information about the determined logical block address range to the storage device 1200. The storage device 1200 may assign or map the logical block address range to or onto an area (e.g., one of the pinned turbo write buffer TWB-p, the non-pinned turbo write buffer TWB-np, and the user storage UST) corresponding to the range area information, based on the range area information and the information about the determined logical block address range received from the host 1100. The host 1100 may direct or request the write operation on various areas of the storage device 1200 based on the logical block address range specified in advance. Accordingly, the performance of the storage system 1000 may be improved.

Figure 18:
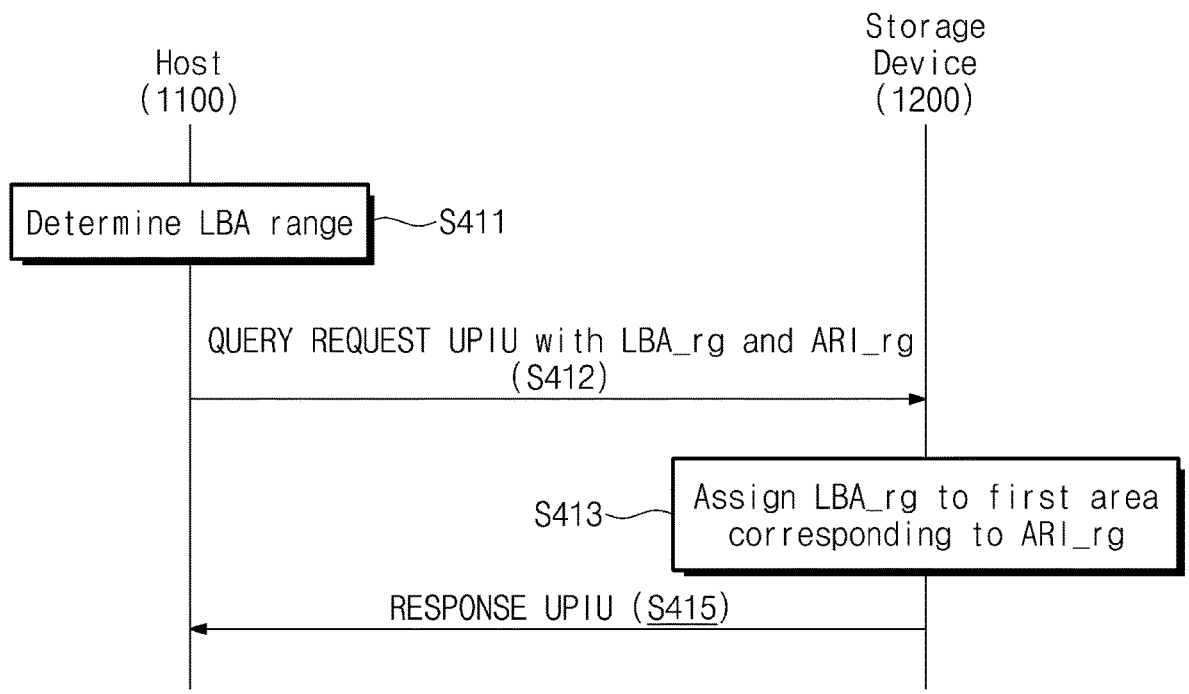
FIG. 18 is a flowchart illustrating an operation of a storage system of FIG. 1.

FIG. 18 is a flowchart illustrating an operation of a storage system of FIG. 1. FIG. 19 is a diagram for describing operation S412 of FIG. 18. An operation in which the host 1100 assigns or specifies a logical block address range to an area of the storage device 1200 (e.g., the pinned turbo write buffer TWB-p, the non-pinned turbo write buffer TWB-np, or the user storage UST) will be described with reference to FIGS. 18 and 19. For brevity of illustration and convenience of description, only a configuration to assign or specify a logical block address range will be described with reference to the flowchart of FIG. 18. The write operation or the read operation is described above, and thus, additional description will be omitted to avoid redundancy.

Referring to FIGS. 1, 8, 18, and 19, in operation S411, the host 1100 may determine a logical block address range. Operation S411 is similar to operation S311 of FIG. 15, and thus, additional description will be omitted to avoid redundancy.

In operation S412, the host 1100 may transfer a query request UPIU including the determined logical block address range LBA_rg and the range area information ARI_rg to the storage device 1200. In operation S413, the storage device 1200 may assign a first area corresponding to the range area information ARI_rg to the logical block address range LBA_rg. Operation S413 is described with reference to FIGS. 15 to 17C, and thus, additional description will be omitted to avoid redundancy. In operation S415, the storage device 1200 may transfer a QUERY RESPONSE UPIU to the host 1100. The QUERY RESPONSE UPIU may be a response to the QUERY REQUEST UPIU transferred in operation S412.

In the embodiment described with reference to FIGS. 15 to 17C, the host 1100 may provide the logical block address range LBA_rg and the range area information ARI_rg to the storage device 1200 by using a write command UPIU. However, the inventive concept is not limited thereto. For example, in the embodiment described with reference to FIG. 18, the host 1100 may provide the logical block address range LBA_rg and the range area information ARI_rg to the storage device 1200 by using the QUERY REQUEST UPIU.

The QUERY REQUEST UPIU is a data structure or a data packet that is used to exchange data between the host 1100 and the storage device 1200 separately from a normal data exchange for a read operation and a write operation.

As illustrated in FIG. 19, the QUERY REQUEST UPIU may include the following fields: Transfer Type (xx010110b), Flags, Task Tag, Query Function, EHS (Error History Source) Length, Data Segment Length, Transaction Specific Fields, Header E2ECRC (End-To-End CRC), Data, Data E2ECRC, Reserved. For brevity, additional description will be omitted with regard to the fields of the QUERY REQUEST UPIU.

In an exemplary embodiment of the inventive concept, the host 1100 may set the range area information ARI_rg or information about the logical block address range LBA_rg at a particular field of the QUERY REQUEST UPIU. For example, the host 1100 may set the information about the logical block address range LBA_rg at the Transaction Specific Fields or the "Data," field. For example, the information about the logical block address range LBA_rg may include a start logical block address and information about a length of the logical block address, and the host 1100 may write or set the start logical block address and the information about the length of the logical block address at the "Data" field or the "Transaction Specific Fields".

The host 1100 may set the range area information ARI_rg at the "Flags" field of the QUERY REQUEST UPIU. Alternatively, the host 1100 may set the range area information ARI_rg at the "Transaction Specific Fields". Alternatively, the host 1100 may set the range area information ARI_rg at the "Query Function" field.

In an exemplary embodiment of the inventive concept, as the host 1100 sets a predefined value at a particular field of the QUERY REQUEST UPIU, the storage device 1200 may recognize that the QUERY REQUEST UPIU is information for specifying a logical block address range. For example, the "Transaction Specific Fields" may include an "OPCODE" field, and the host 1100 may set information for specifying a logical block address range at the "OPCODE," field. Alternatively, the range area information ARI_rg may be included in the "OPCODE" field of the "Transaction Specific Fields".

The above way to specify a logical block address range by using the QUERY REQUEST UPIU is merely exemplary, and the inventive concept is not limited thereto. The host 1100 and the storage device 1200 of the storage system 1000 according to an exemplary embodiment of the inventive concept may support an operation for specifying a logical block address range by setting range area information and information about a logical block address range at a write command UPIU, a query request UPIU, or any other particular command UPIU supported at a predefined interface (e.g., the UFS interface).

Figure 20:
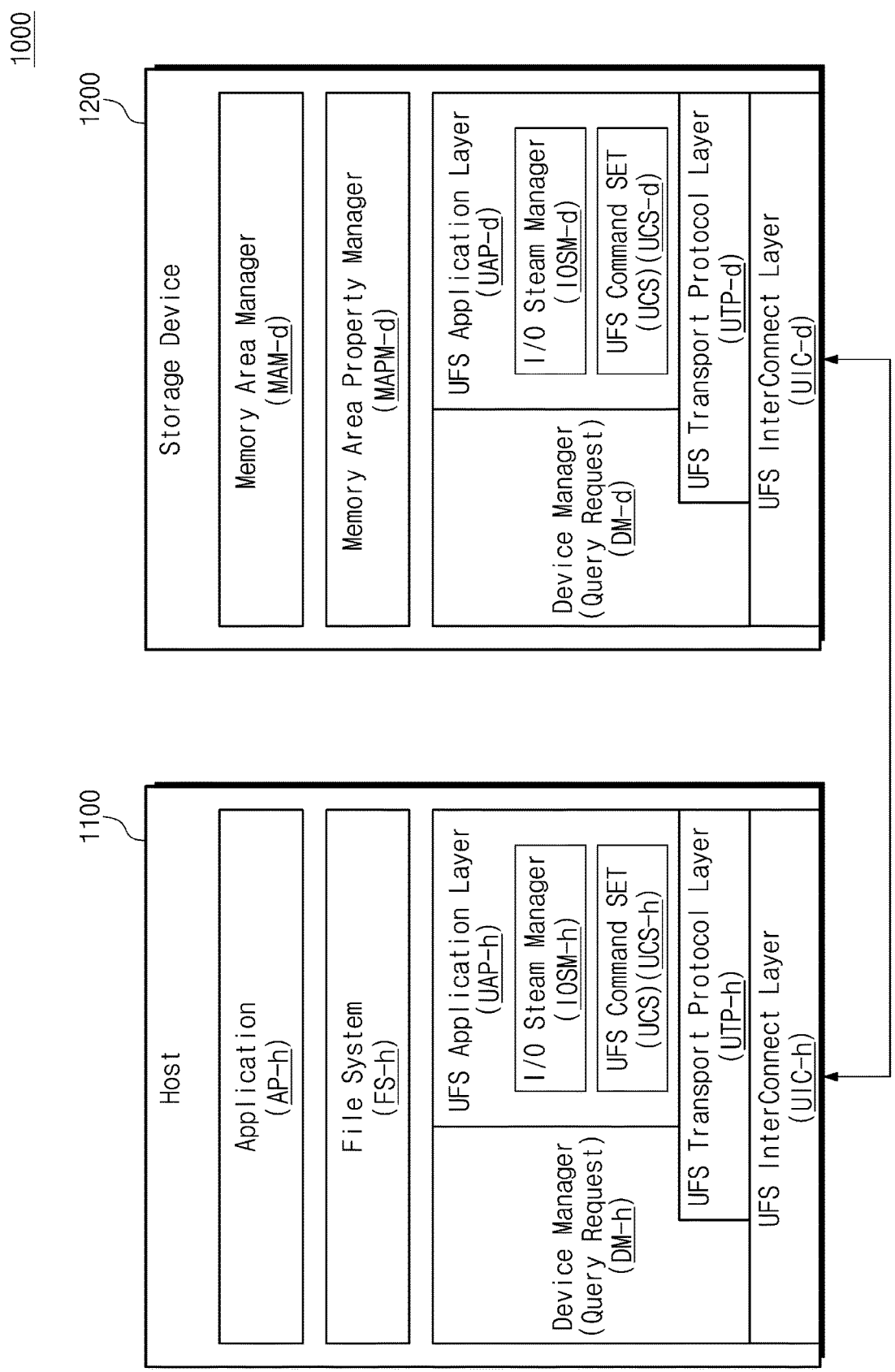
FIG. 20 is a diagram illustrating a hierarchical structure of a storage system of FIG. 1.

FIG. 20 is a diagram illustrating a hierarchical structure of the storage system 1000 of FIG. 1. Referring to FIG. 20, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The file system FS-h may be configured to organize and manage a variety of data generated by the application AP-h. In an exemplary embodiment of the inventive concept, the application AP-h or the file system may be configured to determine a logical block address range to specify a logical block address range for a particular area, as described with reference to FIGS. 15 to 19. Information about the determined logical block address range may be provided to a lower layer (e.g., the device manager DM-h or the UFS application layer UAP-h).

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

In an exemplary embodiment of the inventive concept, as described with reference to FIGS. 11 to 14, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set. UCS-h.

In an exemplary embodiment of the inventive concept, as described with reference to FIGS. 15 to 19, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands depending on the methods described with reference to FIGS. 11 to 19.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer and the device manager DM-h may communicate through a UIO-SAP.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST.

The above hierarchical structure and function of each of the host 1100 and the storage device 1200 is merely exemplary, and the inventive concept is not limited thereto.

Figure 21:
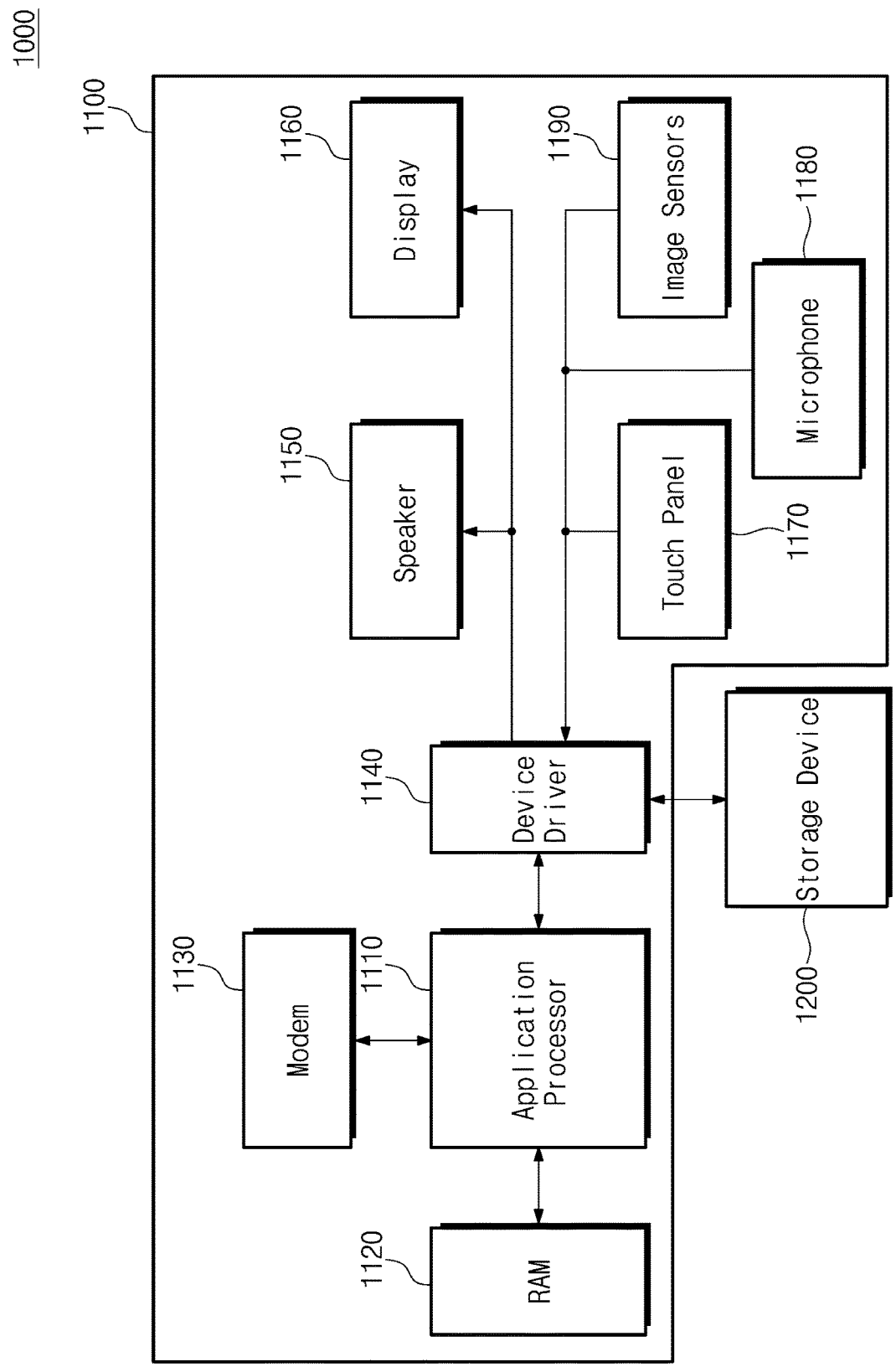
FIG. 21 is a block diagram illustrating a storage system according to an exemplary embodiment of the inventive concept in detail.

FIG. 21 is a block diagram illustrating the storage system 1000 according to an exemplary embodiment of the inventive concept in detail. Referring to FIGS. 20 and 21, the storage system 1000 may include the host 1100 and the storage device 1200. The host 1100 and the storage device 1200 may operate as described with reference to FIGS. 1 to 20.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110.

The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to the user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

Figure 22:
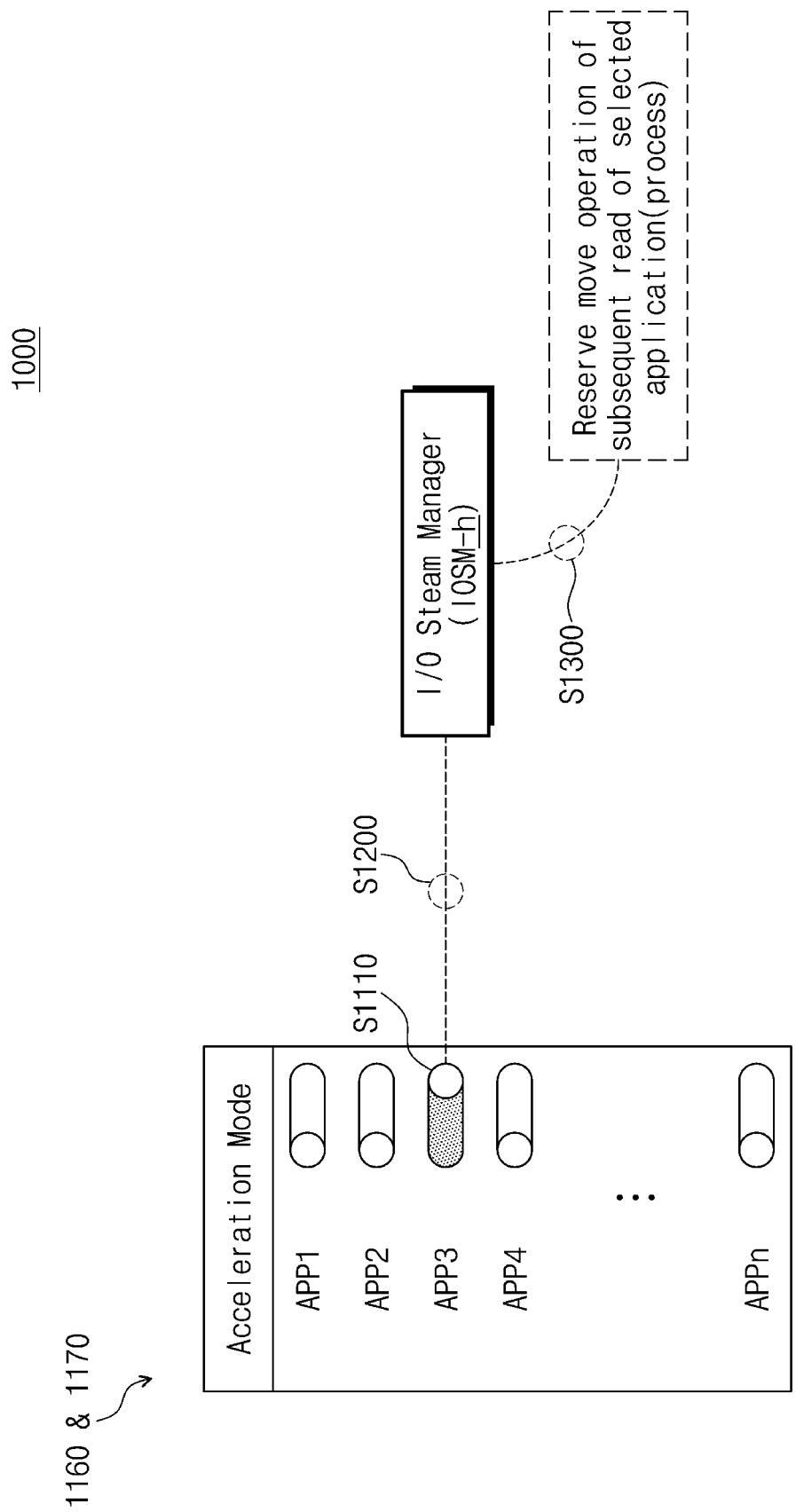
FIG. 22 illustrates a diagram in which an exemplary embodiment of the inventive concept is applied to a storage system.

FIG. 22 illustrates a diagram in which an exemplary embodiment of the inventive concept is applied to the storage system 1000. Referring to FIGS. 21 and 22, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S1100, the user may touch an enable location of the acceleration mode of the third application APP3. The storage system 1000 may sense a touch of the user, in other words, the directions activating the third application APP3 through the touch panel 1170. In operation S1200, information of the third application APP3 or processes of the third application APP3 may be transferred to the I/O stream manager IOSM-h.

As the information of the third application APP3 or the processes of the third application APP3 are received, in operation S1300, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request MU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APPS are moved to the pinned turbo write buffer TWB-p or the non-pinned turbo write buffer TWB-zip, an operation of reading the data associated with the third application APP3 is accelerated. Accordingly, the performance of the third application APP3 may be accelerated.

According to exemplary embodiments of the inventive concept, a host of a storage system may specify one area of various areas of a storage device and may store data in the selected area. Accordingly, a storage device with improved performance, and an operation method of a storage system including the storage device and a host device controlling the storage device are provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An operation method of a Universal Flash Storage (UFS) device comprising a nonvolatile memory device including a turbo write buffer and a user storage, and a controller for operation of the UFS device, and a host configured to communicate with the UFS device, wherein a turbo write buffer is divided into a non-pinned buffer area and a pinned buffer area, the method comprising:
    determining, by the host, area information for write data to be written in the nonvolatile memory device, wherein in a turbo read operation the host determines the area information such that the write data is stored in the non-pinned buffer area or the pinned buffer area and in a normal read operation the host determines the area information such that the write data is stored in the user storage;
    transferring, by the host, a first command UFS protocol information unit (UPIU) including a write command with a first logical block address and the area information to the UFS device;
    selecting, by the UFS device an area from among the non-pinned buffer area, the pinned buffer area and the user storage corresponding to the area information;
    transferring, by the UFS device, a ready to transfer UPIU (RTT UPIU) to the host,
    transferring, by the host, a DATA OUT UPIU including the write data to the UFS device in response to the RTT UPIU;
    storing, by UFS device, the received write data in the area corresponding to the area information;
    mapping, by UFS device, the first logical block address with a physical address of the area corresponding to the area information;
    transferring, by the UFS device, a RESPONSE UPIU to the host after transferring and storing the write data to the UFS device;
    transferring, by the host, a second command UPIU including a read command and information about the first logical block address to the UFS device; and
    performing the turbo read operation on the area to read data corresponding to the first logical block address when the area corresponding to the area information is the pinned turbo write buffer or the non-pinned turbo write buffer, and the normal read operation on the area to read data corresponding to the first logical block address when the area corresponding to the area information is the user storage,
    wherein the write data stored in the pinned buffer area is flushed to the user storage in response to a flush request from the host, and
    wherein the write data stored in the non-pinned buffer area is flushed to the user storage according to a flush policy of the UFS device,
    wherein the write data stored in the pinned buffer area is flushed to the user storage before all of the data stored in the non-pinned buffer area is flushed to the user storage.

2. The operation method of claim 1 further comprising:
    transferring, by the UFS device, at least one DATA IN UPIU including the read data to the host;
    transferring, by the UFS device, a RESPONSE UPIU in response to the second command UPIU to the host after completely transferring the read data to the host.

3. The operation method of claim 1, further comprising, migrating the write data stored in the pinned turbo write buffer to the non-pinned turbo write buffer or moving the write data stored in the non-pinned turbo write buffer to the pinned turbo write buffer based on a request of the host.

4. The operation method of claim 1, further comprising periodically performing a migration or flush operation to move the write data from the turbo write buffer to the user storage.

5. The operation method of claim 1, comprising, wherein the first command UFS protocol information unit (UPIU) includes a first write command descriptor block.

6. The operation method of claim 1, comprising, wherein the area information is included in a "GROUP NUMBER" field of the first write command descriptor block.

7. The operation method of claim 1, comprising, wherein the area information is included in a "Flags" field of the first command UPIU.

8. The operation method of claim 1, comprising, wherein each of the non-pinned buffer area and the pinned buffer area includes memory cells each configured to store "n" bits (n being a positive integer), and the user storage includes memory cells each configured to store "m" bits (m being a positive integer greater than n).

9. A Universal Flash Storage (UFS) device, comprising:
    a nonvolatile memory device including a turbo write buffer divided with a non-pinned buffer area and a pinned buffer area, and a user storage area; and
    a memory controller configured to:
    receive a command UFS protocol information unit (UPIU) including a write command with a logical block address and block information from a host to the UFS device,
    select a block from the non-pinned buffer area and the pinned buffer area when the block information indicate that a high speed read operation is necessary and a block from the user storage area when the block information indicate that a normal read operation is necessary;
    transfer a ready to transfer UFS protocol information unit (UPIU) to the host;
    receive a DATA OUT UPIU in which data corresponding to the logical block address are included from the host;
    store the data in the block corresponding to the block information;
    transfer a response UPIU to the host;
    manage a mapping relationship between the logical block address and a physical address of the block corresponding to the block information;
    receive a read command including the logical block address from the host; and perform the high speed read operation on the block to read the data corresponding to the logical block address when the block corresponding to the block information is in the pinned turbo write buffer or the non-pinned turbo write buffer, and perform the normal read operation on the block to read the data corresponding to the logical block address when the block corresponding to the block information is in the user storage area, wherein the data stored in the pinned buffer area is flushed to the user storage in response to a flush request from the host; and wherein the data stored in the non-pinned buffer area is flushed to the user storage according to a flush policy of the UFS device, wherein the data stored in the pinned buffer area is flushed to the user storage before all of the data stored in the non-pinned buffer area is flushed to the user storage.

10. The UFS device of claim 9, wherein the memory controller further configured to:

transfer at least one DATA IN UFS protocol information unit including read data to the host.

11. The UFS device of claim 9, wherein the memory controller further configured to:

migrate the data stored in the pinned turbo write buffer to the non-pinned turbo write buffer based on a request of the host; or move the data stored in the non-pinned turbo write buffer to the pinned turbo write buffer based on a request of the host.

12. The UFS device of claim 11, wherein the memory controller further configured to:

periodically perform a migration or flush operation to move the data from the turbo write buffer to the user storage.

13. The UFS device of claim 9, wherein the command UFS protocol information unit (UPIU) includes a write command descriptor block.

14. The UFS device of claim 9, wherein the block information is included in a "GROUP NUMBER" field of the first write command descriptor block.

15. The UFS device of claim 9, wherein the block information is included in a "Flags" field of the command UPIU.

16. The UFS device of claim 9, wherein each of the pinned buffer area and the pinned buffer area includes memory cells each configured to store "n" bits (n being a positive integer), and the user storage area includes memory cells each configured to store "m" bits (m being a positive integer greater than n).

* * * * *